US006232388B1

(12) United States Patent
Lan et al.

(10) Patent No.: US 6,232,388 B1
(45) **Date of Patent: *May 15, 2001**

(54) INTERCALATES FORMED BY CO-INTERCALATION OF ONIUM ION SPACING/COUPLING AGENTS AND MONOMER, OLIGOMER OR POLYMER MXD6 NYLON INTERCALANTS AND NANOCOMPOSITES PREPARED WITH THE INTERCALATES

(75) Inventors: Tie Lan, Lake Zurich; Hannah T. Cruz, Elk Grove Village; Anthony S. Tomlin, Island Lake, all of IL (US)

(73) Assignee: AMCOL International Corporation, Arlington Heights, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/272,278

(22) Filed: Mar. 19, 1999

Related U.S. Application Data

(60) Provisional application No. 60/096,774, filed on Aug. 17, 1998.

(51) Int. Cl.[7] ...................... C08K 3/00

(52) U.S. Cl. ...................... 524/445; 524/446; 524/447

(58) Field of Search ...................... 524/445, 446, 524/447

(56) References Cited

U.S. PATENT DOCUMENTS 3,929,849 12/1975 Oswald ........ 260/448
4,053,493 10/1977 Oswald ........ 260/448
4,136,103 1/1979 Oswald ........ 260/448
4,851,021 7/1989 Bohrn et al. ........ 65/17
5,659,034 8/1997 DeBord et al. ........ 546/2
5,747,403 5/1998 Boyd et al. ........ 502/62
5,747,560 5/1998 Christiani et al. ........ 523/209
5,910,523 6/1999 Hudson ........ 523/213
5,981,029 11/1999 Harada et al. ........ 428/143
5,994,445 11/1999 Kaschel et al. ........ 524/444
6,057,396 * 5/2000 Lan et al. ........ 524/445
6,071,988 6/2000 Barbee et al. ........ 523/210
6,084,019 7/2000 Matayabas, Jr. et al. ........ 524/445

FOREIGN PATENT DOCUMENTS 0 818 508 A2 1/1998 (EP) ........ C08L/77/00
2209671 1/1998 (CA) ........ C08L/77/06
WO 96/08526 3/1996 (WO) .

* cited by examiner

*Primary Examiner*—Edward J. Cain
(74) *Attorney, Agent, or Firm*—Marshall, O'Toole, Gerstein, Murray & Borun

(57) ABSTRACT

Intercalated layered materials prepared by co-intercalation of an onium ion and MXD6 nylon between the planar layers of a swellable layered material, such as a phyllosilicate, preferably a smectite clay. The spacing of adjacent layers of the layered materials is expanded at least about 3 Å, preferably at least about 5 Å, usually preferably to a d-spacing of about 15–20 Å, e.g., 18 Å with the onium ion spacing/coupling agent. The intercalation of the MXD6 nylon polymer then increases the spacing of adjacent layers an additional at least 3 Å, e.g., to at least about 20 Å, preferably about 25 Å to about 30 Å, generally about 28 Å.

52 Claims, 2 Drawing Sheets

INTERCALATES FORMED BY CO-INTERCALATION OF ONIUM ION SPACING/COUPLING AGENTS AND MONOMER, OLIGOMER OR POLYMER MXD6 NYLON INTERCALANTS AND NANOCOMPOSITES PREPARED WITH THE INTERCALATES

CROSS REFERENCE TO RELATED APPLICATION

This application is a continuation-in-part of U.S. provisional application Ser. No. 60/096,774 filed Aug. 17, 1998.

FIELD OF THE INVENTION

The present invention is directed to intercalated layered materials and, optionally, exfoliates thereof, prepared by contacting, and thereby intercalating, a layered material, e.g., a phyllosilicate, such as a smectite clay, with an onium ion spacing/coupling agent and co-intercalation of the layered material with a melt of MXD6 nylon (as polymerizable reactants, or as the nylon oligomer or polymer) to form nanocomposite materials with new and unexpected gas (particularly $O_2$) barrier properties. The MXD6 nylon can be intercalated in the form of the nylon reactants (meta-xylylene diamine and adipic acid polymerizable monomers) or, can be unexpectedly easily intercalated as the MXD6 nylon oligomer or polymer by direct compounding, e.g., by combining the onium ion-intercalated layered material and the MXD6 nylon in a mixing or extruding device to produce the co-intercalated layered material and the nanocomposite.

The interlaminar spacing of adjacent layers (platelets) of the layered material is expanded at least about 3 Å, preferably at least about 5 Å, to a basal spacing of at least about 10 Å, preferably to at least about 15 Å, and usually to about 18 Å by contacting the layered material with the onium ion spacing/coupling agent for subsequent intercalation with MXD6 nylon. The onium ion may be primary, secondary, tertiary or quaternary and preferably is a long chain ($C_6$+) onium ion spacing/coupling agent having at least one binding (ion-exchange) site capable of ion-exchanging or replacing $Li^+$, $Na^+$, $K^+$, $Ca^+$, $Mg^{+2}$, or other inorganic cations that occur within the interlayer spaces between adjacent layers or platelets of the layered materials. The association of the layered material inorganic cations with the onium ion spacing/coupling agent via ion-exchange enables the conversion of the hydrophilic interior clay platelet surfaces to hydrophobic platelet surfaces. Therefore, polymerizable MXD6 nylon oligomers, or polymers, or meta-xylylene diamine and adipic acid monomers capable of reacting to form MXD6 nylon, can be easily intercalated between adjacent platelets of the layered material, e.g., smectite clay platelets.

In accordance with the preferred embodiment of the present invention, the fully polymerized MXD6 nylon polymer having a weight average molecular weight between about 100 and about 5 million, preferably about 1,000 to about 500,000, is intercalated between adjacent platelets of the onium ion-treated layered material, preferably simultaneously with dispersing the intercalate into an MXD6 nylon matrix polymer, i.e., by direct compounding of the onium ion-treated layered material with the MXD6 nylon polymer. The co-intercalation of the onium ions and MXD6 nylon, or its monomeric reactants, or MXD6 nylon polymerizable oligomers, results in a completely homogeneous dispersion of intercalated layered material and/or exfoliated platelets.

Optionally, the nanocomposite material can be sheared to exfoliate up to 100% of the tactoids or platelet clusters into individual platelets, preferably such that more than 80%; or more than 90% by weight of the layered material can be completely exfoliated into single platelet layers. Quick, easy, and completely homogeneous dispersion of the onium ion/MXD6 nylon co-intercalated layered material in the MXD6 nylon matrix polymer is achieved and the resulting nanocomposite has unexpected $O_2$-impermeability. For example, a film of the MXD6 nylon polymer with the layered material, particularly a smectite clay, such as sodium bentonite, can be formed by direct compounding to provide a sheet of the MXD6 nylon without any visible intercalate filler that has completely unexpected, extremely low gas permeability.

The intercalates of the present invention can be dispersed uniformly into MXD6 nylon materials to form MXD6 nylon polymer/clay intercalate nanocomposites by direct compounding of the onium ion-intercalated clay with sufficient MXD6 nylon for intercalation of the clay to form an MXD6 nylon intercalated clay, as a concentrate, that can later be mixed with MXD6 nylon and/or other polymeric materials to form a nanocomposite. Alternatively, the onium ion-intercalated clay can be intercalated with monomer reactants that are polymerizable to form MXD6 nylon (meta-xylylene diamine and a dicarboxylic acid, e.g., adipic acid) to form the MXD6 nylon co-intercalate.

In another embodiment of the present invention, the MXD6 nylon intercalates can be dispersed in one or more matrix monomers followed by polymerization of the matrix monomer(s), e.g., meta-xylylene diamine and adipic acid, with in-situ polymerization of the monomer reactants to form the polymer, in situ, between the platelets of the layered material, and to form the matrix polymer, e.g., by adding a curing agent, to form the nanocomposite material. For example, curing agents can be directly incorporated into the monomeric MXD6 nylon reactants that are intercalated between platelets of the onium ion-intercalated clay followed by polymerization of the MXD6 nylon reactant intercalant monomers that have been intercalated into the clay interlayer galleries. In accordance with an important feature of the present invention, if an intercalant MXD6 nylon polymer is intercalated into the onium ion-intercalated clay galleries, the MXD6 nylon intercalate can be directly compounded with the pristine matrix polymer, preferably an MXD6 nylon matrix polymer, to form a nanocomposite easily, while achieving a nanocomposite material with unheard of gas ($O_2$) impermeability. If the meta-xylylene and adipic acid polymerizable intercalant monomers, or a polymerizable MXD6 nylon oligomer intercalant is intercalated into the clay galleries, the intercalant(s) can be polymerized together with a desired monomer, oligomer or polymer matrix material, preferably MXD6 nylon, and the combination then can be compounded to form the nanocomposites.

BACKGROUND OF THE INVENTION AND PRIOR ART

It is well known that phyllosilicates, such as smectite clays, e.g., sodium montmorillonite and calcium montmorillonite, can be treated with organic molecules, such as organic ammonium ions, to intercalate the organic molecules between adjacent, planar silicate layers, for bonding the organic molecules with a polymer, for intercalation of the polymer between the layers, thereby substantially increasing the interlayer (interlaminar) spacing between the adjacent silicate layers. The thus-treated, intercalated phyllosilicates, having interlayer spacings increased by at least 3 Å, preferably at least 5 Å, e.g., to an interlayer (interlaminar) spacing of at least about 10–25 Å and up to about 100 Angstroms, then can be exfoliated, e.g., the silicate layers are separated, e.g., mechanically, by high shear mixing. The individual silicate layers, when admixed with a matrix polymer, before, after or during the polymerization of the matrix polymer, e.g., a polyamide—see U.S. Pat. Nos. 4,739,007; 4,810,734; and 5,385,776—have been found to substantially improve one or more properties of the polymer, such as mechanical strength and/or high temperature characteristics.

Exemplary prior art composites, also called "nanocomposites", are disclosed in published PCT disclosure of Allied Signal, Inc. WO 93/04118 and U.S. Pat. No. 5,385,776, disclosing the admixture of individual platelet particles derived from intercalated layered silicate materials, with a polymer to form a polymer matrix having one or more properties of the matrix polymer improved by the addition of the exfoliated intercalate. As disclosed in WO 93/04118, the intercalate is formed (the interlayer spacing between adjacent silicate platelets is increased) by adsorption of a silane coupling agent or an onium cation, such as a quaternary ammonium compound, having a reactive group which is compatible with the matrix polymer. Such quaternary ammonium cations are well known to convert a highly hydrophilic clay, such as sodium or calcium montmorillonite, into an organophilic clay capable of sorbing organic molecules.

In accordance with one embodiment of the present invention, intercalates are prepared by contacting a phyllosilicate with a monomeric onium ion spacing/coupling agent compound. To achieve the full advantage of the present invention, the onium ion should include at least one long chain radical ($C_6$+) that may be aliphatic, straight or branched chain, or aralkyl. Exemplary of such suitable $C_6$+ onium ion molecules include primary, secondary, tertiary or quaternary ammonium ions, sulfonium ions, phosphonium ions, oxonium ions, or any ion of an element in Groups V or VI of the periodic table of elements.

In accordance with an important feature of the present invention, best results are achieved by mixing the layered material with the onium ions, e.g., $C_6$+ onium ion spacing/coupling agent, in a concentration of at least about 2% by weight, preferably at least about 5% by weight onium ion compound, more preferably at least about 10% by weight onium ion compound, and most preferably about 30% to about 80% by weight, based on the weight of onium ion compound and carrier (e.g., water, with or without an organic solvent for the onium ion compound) to achieve better sorption of the onium ion spacing/coupling agent compound between the platelets of the layered material. Regardless of the concentration of onium ion compound in the intercalating composition, the weight ratio of MXD6 nylon intercalant:layered material should be at least 1:20, preferably at least 1:10, more preferably at least 1:5, and most preferably about 1:4 to achieve sufficient MXD6 nylon (or its monomeric reactants) intercalation between adjacent inner surfaces of adjacent platelets of the layered material. The onium ion spacing/coupling agent compound sorbed between and bonded to (or complexed with) the silicate platelets via ion-exchange causes surprisingly easy intercalation of the MXD6 nylon polymer, or its monomeric reactants for MXD6 nylon (meta-xylylene diamine and adipic acid) polymerization in-situ.

In accordance with an important feature of the present invention, it has been found that an onium ion-intercalated phyllosilicate, such as a smectite clay, can be intercalated easily with MXD6 nylon to form an onium ion/MXD6 nylon co-intercalate that has excellent intercalate dispersibility in a matrix polymer, particularly an MXD6 nylon matrix polymer and has unexpectedly low gas (particularly $O_2$) permeability in an MXD6 nylon matrix polymer. The intercalate also can be added to any other matrix polymer to enhance a number of properties of the matrix polymer, including tensile strength, heat distortion temperature, gas-impermeability, elongation, and the like.

The onium ion/MXD6 nylon co-intercalates and/or exfoliates thereof can be admixed with a polymer or other organic monomer compound(s) or composition to increase the viscosity of the organic compound or provide a matrix polymer/intercalate and/or matrix polymer/exfoliate composition to enhance one or more properties of the matrix polymer, particularly an MXD6 nylon matrix polymer.

The onium ion M6 nylon co-intercalating process of the present invention provides an intercalate that can be added, particularly by direct compounding (mixing the intercalate directly into a matrix polymer melt) of the intercalate with any matrix polymer, e.g., all market available resin systems, particularly epoxy resins such as: Bisphenol A-derived resins, Epoxy cresol Novolac resins, Epoxy phenol Novolac resins, Bisphenol F resins, polynuclear phenol-glycidyl ether-derived resins, cycloaliphatic epoxy resins, aromatic and heterocyclic glycidyl amine resins, tetraglycidylmethylenedianiline-derived resins, nylons, such as nylon-6 and nylon 66, and particularly MXD6 nylon.

Definitions

Whenever used in this Specification, the terms set forth shall have the following meanings:

"Layered Material" shall mean an inorganic material, such as a smectite clay mineral, that is in the form of a plurality of adjacent, bound layers and has a thickness, for each layer, of about 3 Å to about 50 Å, preferably about 10 Å.

"Platelets" shall mean individual layers of the Layered Material.

"Intercalate" or "Intercalated" shall mean a Layered Material that includes an onium ion spacing/coupling agent disposed between adjacent platelets of the layered Material to increase the interlayer spacing between the adjacent platelets at least 3 Å, preferably at least 5 Å, to an interlayer spacing, for example, of at least about 10 Å, preferably at least about 15 Å, e.g., 18 Å; and after MXD6 nylon co-intercalation, the d-spacing is increased to at least about 20 Å, preferably to 25 Å to 35 Å, e.g., 28 Å.

"Intercalation" shall mean a process for forming an Intercalate.

"Onium Ion Spacing/Coupling Agent" or "Onium Ion Compound" shall mean an organic compound that includes a positively charged atom selected from the group consisting of a nitrogen atom, a phosphorous atom, a sulfur atom or an oxygen atom, preferably a quaternary ammonium compound, and when dissolved in water and/or an organic solvent, an anion dissociates from the onium ion spacing/coupling agent leaving an onium cation that can ion-exchange with a silicate platelet exchangeable cation, e.g., $Na^+$, $Ca_{+2}$, $Li^+$, $Mg^{+2}$, or $K^+$.

"MXD6 nylon" shall mean a nylon polymer, or meta-xylylene dianine and a dicarboxylic acid, specifically adipic acid, monomer reactants or prepolymer (oligomer) that can react and/or polymerize with curing agents to yield an MXD6 nylon polymer. The polymer, monomer reactants, or prepolymer (oligomer) shall be a polymer of an amide that is the reaction product of meta-xylylene diamine and adipic acid.

"Co-intercalation" shall mean a process for forming an intercalate by intercalation of an onium ion spacing/coupling agent and, at the same time or separately, intercalation of MXD6 nylon polymer, or intercalation of polymerizable monomers capable of reacting and polymerizing to form an MXD6 nylon polymer, or intercalation of an MXD6 nylon oligomer.

"Concentrate" shall mean an intercalate or exfoliate, formed by intercalation of MXD6 nylon into a layered silicate material, to form a concentrate comprising 10–90% MXD6 nylon intercalant polymer and 10–90% intercalated layered silicate material.

"Intercalating Carrier" shall mean a carrier comprising water and/or an organic solvent used with the onium ion spacing/coupling agent and/or with the MXD6 nylon intercalant monomer/oligomer or polymer to form an Intercalating Composition capable of achieving Intercalation of the onium ion spacing/coupling agent and, at the same time or separately, intercalation of the MXD6 nylon polymer or monomer reactants between platelets of the Layered Material.

"Intercalating Composition" or "Intercalant Composition" shall mean a composition comprising an onium ion spacing/coupling agent and/or MXD6 nylon Intercalants, and a Layered Material, with or without an Intercalating Carrier.

"Exfoliate" or "Exfoliated" shall mean individual platelets of an Intercalated Layered Material or tactoids or clusters of individual platelets, e.g., 2–10 platelets, preferably 2–5 platelets, that are smaller in total thickness than the non-exfoliated Layered Material, dispersed as individual platelets or tactoids throughout a carrier material, such as water, a polymer, an alcohol or glycol, or any other organic solvent, or throughout a matrix polymer, such as MXD6 nylon.

"Exfoliation" shall mean a process for forming an Exfoliate from an Intercalate.

"Matrix Polymer" shall mean a thermoplastic or thermosetting polymer that the Intercalate or Exfoliate is dispersed within to improve the mechanical strength, thermal resistance, and/or particularly the gas ($O_2$) impermeability of the Matrix Polymer, particularly MXD6 nylon.

SUMMARY OF THE INVENTION

In brief, the present invention is directed to intercalated layered materials prepared by co-intercalation of an onium ion and MXD6 nylon between the planar layers of a swellable layered material, such as a phyllosilicate, preferably a smectite clay. The spacing of adjacent layers of the layered materials is expanded at least about 3 Å, preferably at least about 5 Å, to at least about 10 Å, preferably to at least about 15 Å, usually to about 15–30 Å, e.g., 18 Å with an onium ion spacing/coupling agent. The intercalation of the MXD6 nylon polymer then increases the d-spacing of adjacent layers to at least about 20 Å, preferably about 25 Å to about 35 Å, generally about 28 Å.

As shown in the examples, MXD6 nylon film that does not include the intercalates and/or exfoliates of the present invention has an oxygen permeability of about 0.16 to about 0.17 cc/100 $in^2$/day, at atmospheric pressure, over a test period of 378 hours. By incorporating only 2.5% by weight of the intercalates and/or exfoliates (nanomers) of the present invention, the oxygen permeability is reduced to about 0.04 to about 0.05 cc/100 $in^2$/day (less than ⅓ of the oxygen permeability). By doubling the amount of nanomer included in the MXD6 nanocomposite to about 5% by weight nanomer, the oxygen permeability of the nanocomposite is reduced to about 0.01 to about 0.02 cc/100 $in^2$/day, or about a 95% reduction in oxygen permeability.

It is theorized that the surprising reduction in oxygen-permeability is a result of the nanomer acting (alone, or in combination with the MXD6 matrix polymer) as an oxygen scavenger to bind oxygen that it contacts to prevent the transmission of oxygen through the matrix polymer that the nanomer is dispersed within.

The present invention is directed to the method of preparing intercalated layered materials prepared by co-intercalation of onium ion spacing/coupling agents and MXD6 nylon into the galleries of the layered materials to form intercalates or intercalate concentrate compositions that provide new and unexpected gas, particularly oxygen, impermeability when incorporated into, as by direct compounding with, matrix polymers, particularly MXD6 nylon.

The present invention also is directed to the intercalates and exfoliates prepared from the intercalate or intercalate concentrate compositions. The exfoliate can be prepared by adding the concentrate to polymerizable monomer/oligomer, or adding the polymer, e.g., MXD6 nylon, and then curing. The presence of polymerizable monomer or oligomer in the galleries of the layered materials makes the layered materials compatible to the parent matrix polymer, e.g., MXD6 nylon, when the intercalate is added to additional matrix polymer that is the same as the monomer or oligomer intercalated. Therefore, for example, when mixed with more MXD6 nylon, the layered materials are unexpectedly ready to be dispersed or exfoliated in the MXD6 nylon matrix polymer. When a polymer curing agent is added, the layered materials may be exfoliated by virtue of the expanding, polymerizing MXD6 nylon monomer and resulting polymer molecules dispersed between platelet layers, depending upon the degree of polymerization achieved. The exfoliated individual layers and tactoids of the layered materials will perform as a polymer reinforcement and molecule (gas) barrier in a matrix polymer to improve the mechanical properties and barrier properties, e.g., gas impermeability, of the matrix polymer. The exfoliate also can be prepared by directly adding a curing agent to the monomer/-oligomer/or polymer/intercalated concentrate. The curing agent will penetrate into the gallery region of the intercalate to react with the polymerizable monomers, oligomers or polymers previously intercalated in the interlayer gallery and form uniformly dispersed platelets or a multi-layer intercalate in the resulting nanocomposite, having a high solids content.

In another embodiment of the present invention, the intercalate can be added into a polar organic compound or a polar organic compound-containing composition carrier or solvent to provide unexpectedly viscous carrier compositions, for delivery of the carrier or solvent, or for administration of an active compound that is dissolved or dispersed in the carrier or solvent. Such compositions, especially the high viscosity gels, are particularly useful for delivery of active compounds, such as oxidizing agents for hair waving lotions, and drugs for topical administration, since extremely high viscosities are obtainable; and for admixtures of the intercalate, or exfoliate thereof, with polar solvents in modifying rheology, e.g., of cosmetics, oil-well drilling fluids, paints, lubricants, especially food grade lubricants, in the manufacture of oil and grease, and the like. Such intercalates and/or exfoliates also are especially useful in admixture with matrix thermoplastic or thermosetting polymers in the manufacture of polymeric articles, particularly when added to and mixed with an MXD6 nylon matrix polymer.

The intercalate-containing and/or exfoliate-containing compositions can be in the form of a stable thixotropic gel that is not subject to phase separation and can be used to deliver any active materials, such as in the cosmetic, hair care and pharmaceutical industries. The layered material is intercalated by contact with the onium ion spacing/coupling agent and simultaneously or thereafter adding the MXD6 nylon to the onium ion-treated layered material, such as by direct compounding in an extruder, to co-intercalate the onium ion and MXD6 nylon between adjacent phyllosilicate platelets and optionally separate (exfoliate) the layered material into individual platelets.

Addition of the onium ion/MXD6 nylon intercalate to a polymer melt enhances one or more properties, such as strength or temperature resistance, and particularly gas impermeability; or mixing the intercalate with a carrier or solvent material maintains and/or increases viscosity and thixotropy of the carrier material. The intercalate is easily, homogeneously and uniformly dispersed throughout the carrier or solvent or matrix polymer to achieve new and unexpected viscosities in the carrier/platelet compositions even after addition of an active organic compound, such as a cosmetic component or a medicament, for administration of the active organic compound(s) from the composition; and provides new and unexpected gas barrier properties to matrix polymers, particularly MXD6 nylon.

DETAILED DESCRIPTION OF THE PREFERRED EMBODIMENTS

Figure 1:
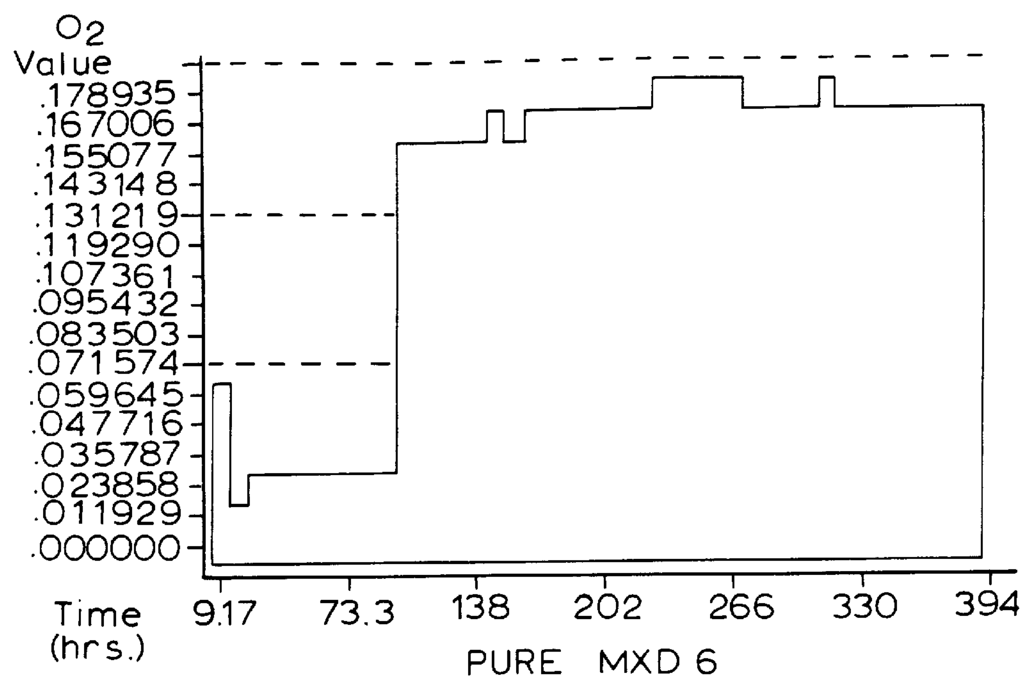
FIG. 1 is a graph showing the oxygen permeability, with time (cc/100 in$^2$/day), of MXD6 nylon (without an intercalate or exfoliate) over 378 hours at 65% relative humidity. Data are presented in Table 2.
Figure 2:
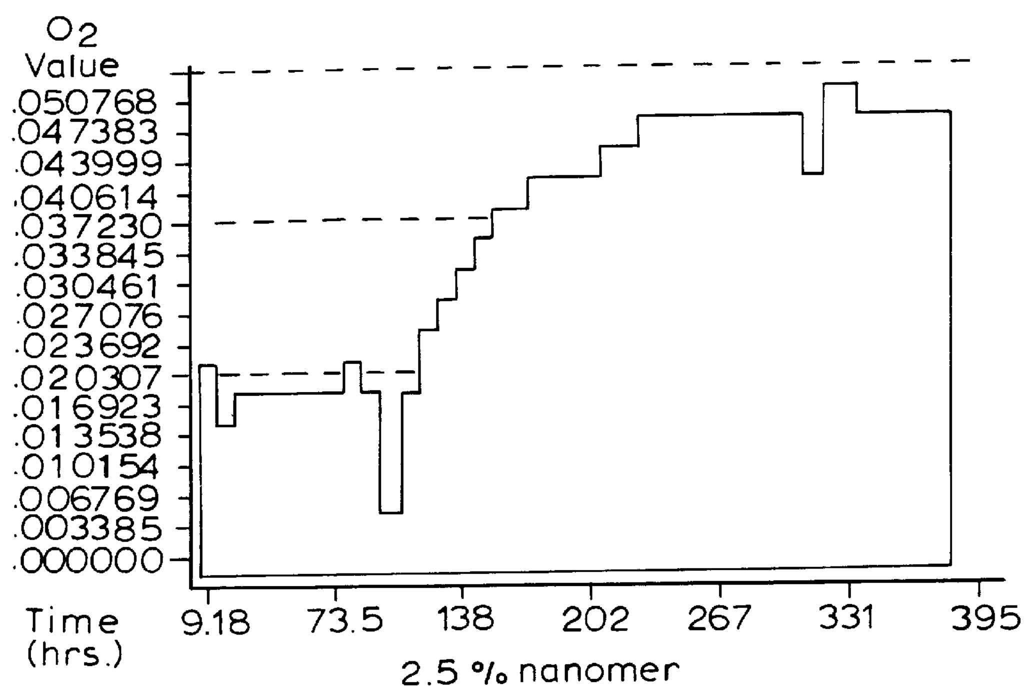
FIG. 2 is a graph showing the oxygen permeability, with time (cc/100 in$^2$/day), of MXD6 nylon having 2.5% of the intercalate of Example 2. Data are presented in Table 3.
Figure 3:
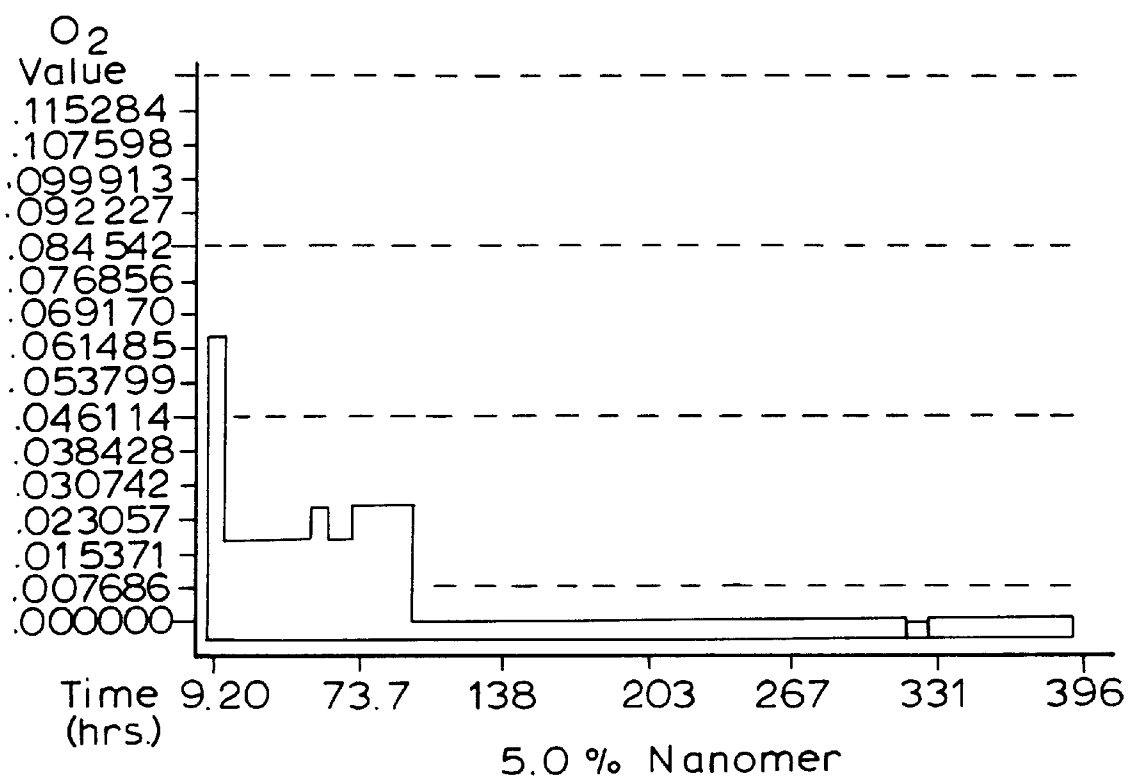
FIG. 3 is a graph showing the oxygen permeability, with time (cc/100 in$^2$/day), of MXD6 nylon having 5.0% of the intercalate of Example 2. Data are presented in Table 4.

Setup Information For FIGS. 1–3
Data of FIGS. 1–3 were obtained on a Mocon OX-TRAN 2/20 Oxygen Transmission Analysis System in accordance with the following Setup Information and parameters:

| Material Identity | Type/Area F/P | Type/Area cm$^2$ | Thick mil | Indiv. Zero | Cycle Count | Cond Hr. | Status | Elapsed Time |
|---|---|---|---|---|---|---|---|---|
| FIG. 1: | | | | | | | | |
| Pure MXD6 | Film | 50 | 2.7 | Yes | 13 | 2.00 | Test | 378 |

Module 1 Parameters

| | |
|---|---|
| Exam = 60 min | Bp = 731 |
| ReZr = 6/6 | Oxygen = 100.0% |
| Sp = 23.0 | 65% Rh |
| Tp = 23.0 | Nitrogen = 65% Rh |

Cell A - Pure MXD6
Trans. reate (cc/U/day)

| 100% | 02 Level | 21.0% |
|---|---|---|
| 2.53210 | U = m$^2$ | 0.531741 |
| 0.163361 | U = 100 in$^2$ | 0.034306 |

Elapsed test = 378 hr

-continued

Setup Information For FIGS. 1–3
Data of FIGS. 1–3 were obtained on a Mocon OX-TRAN 2/20 Oxygen Transmission Analysis System in accordance with the following Setup Information and parameters:

| Material Identity | Type/Area F/P | Type/Area cm$^2$ | Thick mil | Indiv. Zero | Cycle Count | Cond Hr. | Status | Elapsed Time |
|---|---|---|---|---|---|---|---|---|
| FIG. 2: | | | | | | | | |
| 2.5% PGW/oda | Film | 50 | 2.7 | Yes | 13 | 2.00 | Test | 378 |

Module 1 Parameters

| | |
|---|---|
| Exam = 60 min | Bp = 730 |
| ReZr = 6/6 | Oxygen = 100.0% |
| Sp = 23.0 | 65% Rh |
| Tp = 23.0 | Nitrogen = 64% Rh |

Cell B - 2.5% PGW/oda
Trans. rate (cc/U/day)

| 100% | 02 Level | 21.0% |
|---|---|---|
| 0.714100 | U = m$^2$ | 0.149961 |
| 0.046071 | U = 100 in$^2$ | 0.009675 |

Elapsed test = 378 hr

| Material Identity | Type/Area F/P | Type/Area cm$^2$ | Thick mil | Indiv. Zero | Cycle Count | Cond Hr. | Status | Elapsed Time |
|---|---|---|---|---|---|---|---|---|
| FIG. 3 | | | | | | | | |
| 5.0% PGW/oda | Film | 50 | 4.1 | Yes | 12 | 2.00 | Test | 378 |

Module 2 Parameters

| | |
|---|---|
| Exam = 60 min | Bp = 731 |
| ReZr = 6/6 | Oxygen = 100.0% |
| Sp = 23.0 | 68% Rh |
| Tp = 23.0 | Nitrogen = 66% Rh |

Cell A - 5.0% PGW/oda
Trans. rate (cc/U/day)

| 100% | 02 Level | 21.0% |
|---|---|---|
| −0.0346 | U = m$^2$ | −0.0073 |
| −0.0022 | U = 100 in$^2$ | −0.0005 |

Elapsed test = 378 hr

To form the intercalated and exfoliated materials of the present invention, the layered material, e.g., the phyllosilicate, should be swelled or intercalated, in the preferred embodiment, by sorption of an onium ion spacing/coupling agent and, simultaneously or subsequently intercalated with MXD6 nylon.

While the invention described herein is disclosed by way of the preferred embodiment via expanding the interlaminar spacing between adjacent platelets of a layered silicate material, e.g., a phyllosilicate, by first intercalating onium ions between the silicate platelets, prior to or simultaneously with intercalating a MXD6 nylon intercalant, it should be understood that the MXD6 nylon intercalant can be intercalated between and complexed to the internal platelet faces by other well known mechanisms, such as the dipole/dipole (direct intercalation of the MXD6 oligomer or polymer) method disclosed in this Assignee's U.S. Pat. Nos. 5,880,197 and 5,877,248, hereby incorporated by reference; and by intercalating a silane coupling agent, or by the acidification technique, by substitution with hydrogen (ion-exchanging the interlayer cations with hydrogen by use of an acid or ion-exchange resin) as disclosed in the Deguchi U.S. Pat. No. 5,102,948, and in the Pinnavaia, et al. U.S. Pat. No. 5,853,886, hereby incorporated by reference.

Sorption of the onium ion spacing/coupling agent should be sufficient to achieve expansion of the interlayer spacing of adjacent platelets of the layered material (when measured dry) at least about 3 Å, preferably at least about 5 Å, and intercalation of both the onium ion spacing/coupling agent and MXD6 nylon should achieve a d-spacing of at least about 20 Å, preferably at least about 25 Å.

The onium ion spacing/coupling agent is introduced into the layered material galleries in the form of a solid or liquid composition (neat or aqueous, with or without an organic solvent, e.g., an aliphatic hydrocarbon, such as heptane to, if necessary, aid to dissolve the onium ion compound) having an onium ion spacing/coupling agent concentration sufficient to provide a concentration of about 5% to about 10% by weight clay (90–95% water) and the onium ion compound is dissolved in the clay slurry water, preferably at a molar ratio of onium ions to exchangeable interlayer cations of at least about 0.5:1, more preferably at least about 1:1. The onium ion-intercalated clay then is separated from the water easily, since the clay is now hydrophobic, and dried in an oven to less than 5% water, preferably bone dry, before being compounded with the MXD6 nylon for MXD6 nylon intercalation and compounding. The onium ion spacing/coupling agent compound can be added as a solid with the addition to the layered material onium ion compound blend of preferably at least about 20% water, more preferably at least about 30% water or more, based on the dry weight of layered material. Preferably about 30% to about 50% water, more preferably about 30% to about 40% water, based on the dry weight of the layered material, is included in the onium ion intercalating composition, so that less water is sorbed by the intercalate, thereby necessitating less drying energy after onium ion intercalation.

The onium ion spacing/coupling agent cations intercalated via ion-exchange into the interlayer spaces between adjacent layered material platelets are primary, secondary, tertiary or quaternary onium ions having the following preferred structure:

$R_1$ $R_2$
$X^+$
$R_3$ $R_4$ wherein X=N, P, S, or O; and wherein $R_1$, $R_2$, $R_3$ and $R_4$ are H or organic moieties, such as linear or branched alkyl, aryl or aralkyl moieties having 1 to about 24 carbon atoms.

The more preferred $C_6$+ onium ions are preferably quaternary ammonium ions having Formula 1, as follows:

Formula 1

$R_1$ $R_2$
$N^+$
$R_3$ $R_4$

Wherein $R_1$ is a long chain alkyl moiety ranging from $C_6$ to $C_{24}$, straight or branched chain, including mixtures of long chain moieties, i.e., $C_6$, $C_8$, $C_{10}$, $C_{12}$, $C_{14}$, $C_{16}$, $C_{18}$, $C_{20}$, $C_{22}$ and $C_{24}$, alone or in any combination; and $R_2$, $R_3$ and $R_4$ are moieties, same or different, selected from the group consisting of H, alkyl, benzyl, substituted benzyl, e.g., straight or branched chain alkyl-substituted and halogen-substituted; ethoxylated or propoxylated alkyl; ethoxylated or propoxylated benzyl, e.g., 1–10 moles of ethoxylation or 1–10 moles of propoxylation.

Additional useful multi-charged spacing/coupling agents include for example, tetra-, tri-, and di-onium species such as tetra-ammonium, tri-ammonium, and di-ammonium (primary, secondary, tertiary, and quaternary), -phosphonium, -oxonium, or -sulfonium derivatives of aliphatic, aromatic or arylaliphatic amines, phosphines, esters, alcohols and sulfides. Illustrative of such materials are di-onium compounds of the formula:

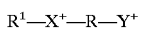

where $X^+$ and $Y^+$, same or different, are ammonium, sulfonium, phosphonium, or oxonium radicals such as $^+NH_3$, $^+NH_2$—, $^+N(CH_3)_3$, $^+N(CH_3)_2$—, $^+N(CH_3)_2(CH_2CH_3)$, $^+N(CH_3)(CH_2CH_3)$—, $^+S(CH_3)_3$, $^+S(CH_3)_2$—, $^+P(CH_3)_3$, $^+P(CH_3)_2$—, $^+NH_4$, $^+NH_3$—, and the like; R is an organic spacing, backbone radical, straight or branched, preferably having from 2 to 24, more preferably 3 to 10 carbon atoms, in a backbone organic spacing molecule covalently bonded at its ends to charged $N^+$, $P^+$, $S^+$ and /or $O^+$ cations and $R^1$ can be hydrogen, or an alkyl radical of 1 to 22 carbon atoms, linear or branched, preferably having at least 6 carbon atoms. Examples of R include substituted or unsubstituted alkylene, cycloalkenylene, cycloalkylene, arylene, alkylarylene, either unsubstituted or substituted with amino, alkylamino, dialkylamino, nitro, azido, alkenyl, alkoxy, cycloalkyl, cycloalkenyl, alkanoyl, alkylthio, alkyl, aryloxy, arylalkylamino, alkylamino, arylamino, dialkylamino, diarylamino, aryl, alkylsufinyl, aryloxy, alkylsulfinyl, alkylsulfonyl, arylthio, arylsulfinyl, alkoxycarbonyl, arylsulfonyl, or alkylsilane. Examples of $R^1$ include non-existent; H; alkyl having 1 to 22 carbon atoms, straight chain or branched; cycloalkenyl; cycloalkyl; aryl; alkylaryl, either unsubstituted or substituted or substituted with amino, alkylamino, dialkylamino, nitro, azido, alkenyl, alkoxy, cycloalkyl, cycloalkenyl, alkanoyl, alkylthio, alkyl, aryloxy, arylalkylamino, alkylamino, arylamino, dialkylamino, diarylamino, aryl, alkylsufinyl, aryloxy, alkylsulfinyl, alkylsulfonyl, arylthio, arylsulfinyl, alkoxycarbonyl, arylsulfonyl, or alkylsilane. Illustrative of useful R groups are alkylenes, such as methylene, ethylene, octylene, nonylene, tert-butylene, neopentylene, isopropylene, sec-butylene, dodecylene and the like; alkenylenes such as 1-propenylene, 1-butenylene, 1-pentenylene, 1-hexenylene, 1-heptenylene, 1-octenylene and the like; cycloalkenylenes such as cyclohexenylene, cyclopentenylene and the like; alkanoylalkylenes such as butanoyl octadecylene, pentanoyl nonadecylene, octanoyl pentadecylene, ethanoyl undecylene, propanoyl hexadecylene and the like; alkylaminoalkylenes, such as methylamino octadecylene, ethylamino pentadecylene, butylamino nonadecylene and the like; dialkylaminoalkylene, such as dimethylamino octadecylene, methylethylamino nonadecylene and the like; arylaminoalkylenes such as phenylamino octadecylene, p-methylphenylamino nonadecylene and the like; diarylaminoalkylenes, such as diphenylamino pentadecylene, p-nitrophenyl-p'-methylphenylamino octadecylene and the like; alkylarylaminoalkylenes, such as 2-phenyl-4-methylamino pentadecylene and the like; alkylsulfinylenes, alkylsulfonylenes, alkylthio, arylthio, arylsulfinylenes, and arylsulfonylenes such as butylthio octadecylene, neopentylthio pentadecylene, methylsulfinyl nonadecylene, benzylsulfinyl pentadecylene, phenylsulfinyl octadecylene, propylthiooctadecylene, octylthio pentadecylene, nonylsulfonyl nonadecylene, octylsulfonyl hexadecylene, methylthio nonadecylene, isopropylthio octadecylene, phenylsulfonyl pentadecylene, methylsulfonyl nonadecylene, nonylthio pentadecylene, phenylthio octadecylene, ethyltio nonadecylene, benzylthio undecylene, phenethylthio pentadecylene, sec-butylthio octadecylene, naphthylthio undecylene and the like; alkoxycarbonylalkylenes such as methoxycarbonylene, ethoxycarbonylene, butoxycarbonylene and the like; cycloalkylenes such as cyclohexylene, cyclopentylene, cyclo-octylene, cycloheptylene and the like; alkoxyalkylenes such as methoxy-methylene, ethoxymethylene, butoxymethylene, propoxyethylene, pentoxybutylene and the like; aryloxyalkylenes and aryloxyarylenes such as phenoxyphenylene, phenoxymethylene and the like; aryloryalkylenes such as phenoxydecylene, phenoxyoctylene and the like; arylalkylenes such as benzylene, phenthylene, 8-phenyloctylene, 10-phenyldecylene and the like; alkylarylenes such as 3-decylphenylene, 4-octylphenylene, 4-nonylphenylene and the like; and polypropylene glycol and polyethylene glycol substituents such as ethylene, propylene, butylene, phenylene, benzylene, tolylene, p-styrylene, p-phenylmethylene, octylene, dodecylene, octadecylene, methoxy-ethylene, moieties of the formula —$C_3H_6COO$—, —$C_5H_{10}COO$—, —$C_7H_{10}COO$—, —$C_7H_{14}COO$—, —$C_9H_{18}COO$—, —$C_{11}H_{22}COO$—, —$C_{13}H_{26}COO$—, —$C_{15}H_{30}COO$—, and —$C_{17}H_{34}COO$— and —$C{=}C(CH_3)COOCH_2CH_2$—, and the like. Such tetra-, tri-, and di-ammonium, -sulfonium, -phosphonium, -oxonium; ammonium/sulfonium; ammonium/phosphonium; ammonium/oxonium; phosphonium/oxonium; sulfonium/oxonium; and sulfonium/phosphonium medicals are well known in the art and can be derived from the corresponding amines, phosphines, alcohols or ethers, and sulfides.

The preferred multi-charged spacing/coupling agent compounds are multi-onium ion compounds that include at least two primary, secondary, tertiary or quaternary ammonium, phosphonium, sulfonium, and/or oxonium ions having Formula 2, as follows:

Formula 2

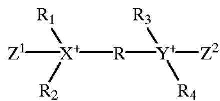

wherein R is an alkylene, aralkylene or substituted alkylene charged atom spacing moiety, preferably ranging from $C_3$ to $C_{24}$, more preferably about $C_3$ to $C_6$ for relatively high charge density (150 milliequivalents/100 grams C.E.C. to 70 milliequivalents/100 grams C.E.C.) layered materials; and preferably from $C_6$ to $C_{12}$ for medium to low charge density (70 milliequivalents/100 grams C.E.C. to 30 milliequivalents/100 grams C.E.C.) layered materials. R can be straight or branched chain, including mixtures of such moieties, i.e., $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$ and $C_{24}$, alone or in any combination; and $R_1$, $R_2$, $R_3$ and $R_4$ are moieties, same or different, selected from the group consisting of hydrogen, alkyl, aralkyl, benzyl, substituted benzyl, e.g., straight or branched chain alkyl-substituted and halogen-substituted; ethoxylated or propoxylated alkyl; ethoxylated or propoxylated benzyl, e.g., 1–10 moles of ethoxylation or 1–10 moles of propoxylation. $Z^1$ and $Z^2$, same or different, may be non-existent, or may be any of the moieties described for $R_1$, $R_2$, $R_3$ or $R_4$. Also, one or both of $Z^1$ and $Z^2$ may include one or more positively charged atoms or onium ion molecules.

Any swellable layered material that sufficiently sorbs the onium ion spacing/coupling agent to increase the interlayer spacing between adjacent phyllosilicate platelets at least about 3 Å, preferably at least about 5 Å, can be used in the practice of this invention. Useful swellable layered materials include phyllosilicates, such as smectite clay minerals, e.g., montmorillonite, particularly sodium montmorillonite; magnesium montmorillonite and/or calcium montmorillonite; nontronite; beidellite; volkonskoite; hectorite; saponite; sauconite; sobockite; stevensite; svinfordite; vermiculite; and the like. Other useful layered materials include micaceous minerals, such as illite and mixed layered illite/smectite minerals, such as rectorite, tarosovite, ledikite and admixtures of illites with the clay minerals named above.

Preferred swellable layered materials are phyllosilicates of the 2:1 type having a negative charge on the layers ranging from about 0.15 to about 0.9 charges per formula unit and a commensurate number of exchangeable metal cations in the interlayer spaces. Most preferred layered materials are smectite clay minerals such as montmorillonite, nontronite, beidellite, volkonskoite, hectorite, saponite, sauconite, sobockite, stevensite, and svinfordite.

As used herein the "interlayer spacing" refers to the distance between the internal faces of the adjacent layers as they are assembled in the layered material before any delamination (exfoliation) takes place. The preferred clay materials generally include interlayer cations such as $Na^+$, $Ca^{+2}$, $K^+$, $Mg^{+2}$, $NH_4^+$ and the like, including mixtures thereof.

The amount of onium ion spacing/coupling agent intercalated into the swellable layered materials, in order that the intercalated layered material platelet surfaces sufficiently complex or bond via ion-exchange to the onium ion spacing/coupling agent molecules such that the layered material may be sufficiently spaced for easy intercalation of MXD6 nylon or its monomeric/oligomeric reactants, may vary substantially between about 2%, preferably at least about 10%, and about 200%, based on the dry weight of the layered material. In the preferred embodiments of the invention, amounts of onium ion employed, with respect to the dry weight of layered material being intercalated, will preferably range from about 8 grams of onium ion spacing/coupling agent compound:100 grams of layered material (dry basis), preferably at least about 10 grams of onium ion spacing/coupling agent compound:100 grams of layered material to about 80–90 grams onium ion spacing/coupling agent compound:100 grams of layered material. More preferred amounts are from about 20 grams of onium ion spacing/coupling agent compound:100 grams of layered material to about 60 grams of onium ion spacing/coupling agent compound:100 grams of layered material (dry basis).

The onium ions and MXD6 nylon intercalants may be introduced into (sorbed within) the interlayer spaces of the layered material in a number of ways. In a preferred method of intercalating the onium ions between adjacent platelets of the layered material, the layered material is slurried in water, e.g., at 5–20% by weight layered material and 80–95% by weight water, and the onium ion compound is dissolved in the water in which the layered material is slurried. If necessary, the onium ion compound can be dissolved first in an organic solvent, e.g., propanol. The layered material then is separated from the slurry water and dried prior to compounding with MXD6 nylon for intercalation of the MXD6 nylon and to form the nanocomposite material in MXD6 nylon matrix polymer. In a preferred method of intercalating the MXD6 nylon, the onium ion-treated layered material is intimately mixed with the MXD6 nylon, e.g., by extrusion or pug milling, to form an intercalating composition comprising the onium ion-intercalated layered material and MXD6 nylon polymer.

To achieve sufficient intercalation of the onium ions between adjacent platelets of the layered material, the layered material onium ion intercalating composition contains at least about 5% by weight, preferably at least about 10% by weight onium ion compound, based on the dry weight of the layered material, so that the resulting onium ion-intercalated layered material has interior platelet surfaces that are sufficiently hydrophobic and sufficiently spaced for intercalation of the MXD6 nylon. The onium ion carrier (preferably water, with or without an organic solvent) can be added by first solubilizing or dispersing the onium ion compound in the carrier; or a dry onium ion compound and relatively dry phyllosilicate (preferably containing at least about 4% by weight water) can be blended and the intercalating carrier added to the blend, or to the phyllosilicate prior to adding the dry onium ion. When intercalating the phyllosilicate with onium ions in slurry form (e.g., 900 pounds water, 100 pounds phyllosilicate, 100 pounds onium ion compound), the amount of water can vary substantially, e.g., from about 4% by weight, preferably from a minimum of at least about 30% by weight water, with no upper limit to the amount of water in the intercalating composition (the phyllosilicate intercalate is easily separated from the intercalating composition due to its hydrophobicity after onium ion treatment).

Alternatively, the onium ion intercalating carrier, e.g., water, with or without an organic solvent, can be added directly to the phyllosilicate prior to adding the onium ion compound, either dry or in solution. Sorption of the onium ion compound molecules may be performed by exposing the layered material to a dry or liquid onium ion compound in the onium ion intercalating composition containing at least about 2% by weight, preferably at least about 5% by weight onium ion compound, more preferably at least about 10% onium ion compound, based on the dry weight of the layered material.

In accordance with another method of intercalating the onium ions and MXD6 nylon between the platelets of the layered material, the layered material, preferably containing at least about 4% by weight water, more preferably about 10% to about 15% by weight water, is blended with water and/or organic solvent solution of an onium ion spacing/coupling agent compound in a ratio sufficient to provide at least about 5% by weight, preferably at least about 10% by weight onium ion compound, based on the dry weight of the layered material. The onium ion compound can be intercalated into the layered material simultaneously with the intercalation of the MXD6 nylon, or the MXD6 nylon may be intercalated after intercalation of the onium ion spacing/coupling agent. The dry onium ion-intercalated clay then is extruded with MXD6 nylon for direct compounding, with intercalation, of the MXD6 nylon into the onium ion-intercalated layered material.

The onium ion spacing/coupling agents have an affinity for the phyllosilicate so that they are sorbed between, and are ion-exchanged with the cations on the inner surfaces of the silicate platelets, in the interlayer spaces.

It is preferred that the onium ion/MXD6 nylon intercalate loading be less than about 10% for purposes of increasing the viscosity of an organic liquid carrier. Intercalate loadings within the range of about 0.05% to about 40% by weight, preferably about 0.5% to about 20%, more preferably about 1% to about 10% significantly enhances viscosity. In general, the amount of intercalate and/or exfoliated particles thereof incorporated into a liquid carrier, such as a polar solvent, e.g., a glycol such as glycerol, is less than about 90% by weight of the mixture, and preferably from about 0.01% to about 80% by weight of the composite material mixture, more preferably from about 0.05% to about 40% by weight of the mixture, and most preferably from about 0.05% to about 20% or 0.05% to about 10% by weight.

In accordance with a preferred embodiment of the present invention, the onium ion-intercalated layered material can be intercalated with MXD6 nylon and then dispersed into one or more melt-processible thermoplastic and/or thermosetting matrix oligomers or polymers, or mixtures thereof, by direct compounding. Matrix polymers for use in this embodiment of the process of this invention may vary widely, the only requirement is that they are melt processible. In this embodiment of the invention, the polymer, e.g., MXD6 nylon, includes at least ten (10), preferably at least thirty (30) recurring monomeric units. The upper limit to the number of recurring monomeric units is not critical, provided that the melt index of the matrix polymer under use conditions is such that the matrix polymer forms a flowable mixture. Most preferably, the matrix polymer is MXD6 nylon that is intercalted into the onium ion-intercalated layered material simultaneously with dispersing the MXD6 nylon-intercalated clay uniformly into the MXD6 nylon matrix polymer. The MXD6 nylon matrix polymer preferably includes from at least about 10 to about 100 recurring monomeric units. In the most preferred embodiments of this invention, the number of recurring units is such that the matrix polymer has a melt index of from about 0.01 to about 12 grams per 10 minutes at the processing temperature.

MXD6 nylon, from Mitsubishi Gas Chemical Company, Inc., Tokyo, Japan is a polymer having the following Formula 3:

Formula 3

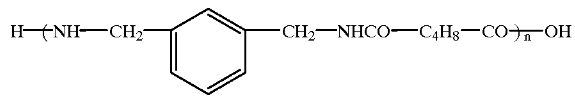

wherein n for the monomer=1;

n for the oligomer=2–10; and n for the polymer=11–20,000,
preferably 11–1,000,
more preferably 11–500.

Other thermoplastic resins and rubbers for use as matrix monomers, oligomers or polymers in the practice of this invention may vary widely. Illustrative of useful thermoplastic resins, which may be used alone or in admixture, are polyactones such as poly(pivalolactone), poly(caprolactone) and the like; polyureanes derived from reaction of diisocyanates such as 1,5-naphthalene diisocyanate; p-phenylene diisocyanate, m-phenylene diisocyanate, 2,4-toluene diisocyanate, 4,4'-diphenylmethane diisocyanate, 3,3'-dimethyl-4,4'-biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, toluidine diisocyanate, hexamethylene diisocyanate, 4,4'-diisocyanatodiphenylmethane and the like and linear long-chain diols such as poly(tetramethylene adipate), poly(ethylene adipate), poly(1,4-butylene adipate), poly(ethylene succinate), poly(2,3-butylene succinate), polyether diols and the like; polycarbonates such as poly[methane bis(4-phenyl) carbonate], poly[1,1-ether bis(4-phenyl) carbonate], poly[diphenylmethane bis(4-phenyl)carbonate], poly[1,1-cyclohexane bis(4-phenyl)carbonate] and the like; polysulfones; polyethers; polyketones; polyamides such as poly(4- amino butyric acid), poly(hexamethylene adipamide), poly (6-aminohexanoic acid), poly(m-xylylene adipamide) or MXD6 nylon, poly(p-xylylene sebacamide), poly(2,2,2-trimethyl hexamethylene terephthalamide), poly (metaphenylene isophthalamide) (NOMEX), poly(p-phenylene terephthalamide) (KEVLAR), and the like; polyesters such as poly(ethylene azelate), poly(ethylene-1, 5-naphthalate, poly(1,4-cyclohexane dimethylene terephthalate), poly(ethylene oxybenzoate) (A-TELL), poly (para-hydroxybenzoate) (EKONOL), poly(1,4-cyclohexylidene dimethylene terephthalate) (KODEL) (cis), poly(1,4-cyclohexylidene dimethylene terephthalate) (KODEL) (trans), polyethylene terephthalate, polybutylene terephthte and the like; poly(arylene oxides) such as poly (2,6-dimethyl-1,4-phenylene oxide), poly(2,6-diphenyl-1,4-phenylene oxide) and the like; poly(arylene sulfides) such as poly(phenylene sulfide) and the like; polyetherimides; vinyl polymers and their copolymers such as polyvinyl acetate, polyvinyl alcohol, polyvinyl chloride; polyvinyl butyral, polyvinylidene chloride, ethylene-vinyl acetate copolymers, and the like; polyacrylics, polyacrylate and their copolymers such as polyethyl acrylate, poly(n-butyl acrylate), polymethylmethacrylate, polyethyl methacrylate, poly(n-butyl methacrylate), poly(n-propyl methacrylate), polyacrylamide, polyacrylonitrile, polyacrylic acid, ethylene-acrylic acid copolymers, ethylene-vinyl alcohol copolymers acrylonitrile copolymers, methyl methacrylate-styrene copolymers, ethylene-ethyl acrylate copolymers, methacrylated butadiene-styrene copolymers and the like; polyolefins such as low density poly(ethylene), poly (propylene), chlorinated low density poly(ethylene), poly(4-methyl-1-pentene), poly(ethylene), poly(styrene), and the like; ionomers; poly(epichlorohydrins); poly(urethane) such as the polymerization product of diols such as glycerin, trimethylol-propane, 1,2,6-hexanetriol, sorbitol, pentaerythritol, polyether polyols, polyester polyols and the like with a polyisocyanate such as 2,4-tolylene diisocyanate, 2,6-tolylene diisocyante, 4,4'-diphenylmethane diisocyanate, 1,6-hexamethylene diisocyanate, 4,4'-dicyclohexyl-methane diisocyanate and the like; and polysulfones such as the reaction product of the sodium salt of 2,2-bis(4-hydroxyphenyl) propane and 4,4'-dichlorodiphenyl sulfone; furan resins such as poly(furan); cellulose ester plastics such as cellulose acetate, cellulose acetate butyrate, cellulose propionate and the like; silicones such as poly(dimethyl siloxane), poly(dimethyl siloxane co-phenylmethyl siloxane), and the like; protein plastics; and blends of two or more of the foregoing.

Vulcanizable and thermoplastic rubbers useful as matrix polymers in the practice of this embodiment of the invention may also vary widely. Illustrative of such rubbers are brominated butyl rubber, chlorinate butyl rubber, polyurethane elastomers, fluoroelastomers, polyester elastomers, polyvinylchloride, butadiene/acrylonitrile elastomers, silicone elastomers, poly(butadiene), poly(isobutylene), ethylene-propylene copolymers, ethylene-propylene-diene terpolymers, sulfonated ethylene-propylene-diene terpolymers, poly(chloroprene), poly(2,3-dimethylbutadiene), poly(butadiene-pentadiene), chlorosulphonated poly(ethylenes), poly(sulfide) elastomers, block copolymers, made up of segments of glassy or crystalline blocks such as poly(styrene), poly(vinyl-toluene), poly(t-butyl styrene), polyesters and the like and the elastomeric blocks such as poly(butadiene), poly(isoprene), ethylene-propylene copolymers, ethylene-butylene copolymers, polyether and the like as for example the copolymers in poly (styrene)-poly(butadiene)-poly(styrene) block copolymer manufactured by Shell Chemical Company under the trade name KRATON®.

Useful thermosetting resins useful as matrix polymers include, for example, the polyamides; polyalkylamides; polyesters; polyurethanes; polycarbonates; polyepoxides; and mixtures thereof.

Most preferred thermoplastic polymers for use as a matrix polymer are thermoplastic polymers such as polyamides, particularly nylons, most particularly MXD6 nylon. Polyamides which may be used as matrix polymers in the process of the present invention are synthetic linear polycarbonamides characterized by the presence of recurring carbonamide groups as an integral part of the polymer chain which are separated from one another by at least two carbon atoms. Polyamides of this type include polymers, generally known in the art as nylons, obtained from diamines and dibasic acids having the recurring unit represented by the general formula:

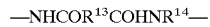

$$—NHCOR^{13}COHNR^{14}—$$

in which $R^{13}$ is an alkylene group of at least 2 carbon atoms, preferably from about 2 to about 11; or arylene having at least about 6 carbon atoms, preferably about 6 to about 17 carbon atoms; and $R^{14}$ is selected from $R^{13}$ and aryl groups. Also, included are copolyamides and terpolyamides obtained by known methods, for example, by condensation of hexamethylene diamine or meta-xylylene diamine and a mixture of dibasic acids consisting of terephthalic acid and adipic acid. Polyamides of the above description are well-known in the art and include, for example, the copolyamide of 30% hexamethylene diammonium isophthalate and 70% hexamethylene diammonium adipate, poly(hexamethylene adipamide) (nylon 6,6), poly(hexamethylene sebacamide) (nylon 6,10), poly(hexamethylene isophthalamide), poly (hexamethylene terephthalamide), poly(heptamethylene pimelamide) (nylon 7,7), poly(octamethylene sebacamide) (nylon 8,8), poly(nonamethylene azelamide) (nylon 9,9) poly(decamethylene azelamide) (nylon 10,9), poly (decamethylene sebacamide) (nylon 10,10), poly[bis(4-amino cyclohexyl)methane-1,10-decane-carboxamide)], poly(m-xylylene adipamide), poly(p-xylylene sebacamide), poly(2,2,2-trimethyl hexamethylene terephthalamide), poly (piperazine sebacamide), poly(p-phenylene terephthalamide), poly(metaphenylene isophthalamide) and the like.

Other useful polyamides for use as a matrix polymer are those formed by polymerization of amino acids and derivatives thereof, as, for example, lactams. Mustrative of these useful polyamides are poly(4-aminobutyric acid) (nylon 4), poly(6-aminohexanoic acid) (nylon 6), poly(7-aminoheptanoic acid) (nylon 7), poly(8-aminooctanoic acid) (nylon 8), poly(9 -aminononanoic acid) (nylon 9), poly(10-aminodecanoic acid) (nylon 10), poly(11-aminoundecanoic acid) (nylon 11), poly(12-aminododecanoic acid) (nylon 12) and the like.

Other matrix or host polymers which may be employed in admixture with the onium ion and MXD6 nylon intercalates of the present invention to form nanocomposites are linear polyesters. The type of polyester is not critical and the particular polyesters chosen for use in any particular situation will depend essentially on the physical properties and features, i.e., tensile strength, modulus and the like, desired in the final form. Thus, a multiplicity of linear thermoplastic polyesters having wide variations in physical properties are suitable for use in admixture with exfoliated layered material platelets in manufacturing nanocomposites in accordance with this invention.

The particular polyester chosen for use as a matrix polymer can be a homo-polyester or a copolyester, or mixtures thereof, as desired. Polyesters are normally prepared by the condensation of an organic dicarboxylic acid and an organic diol, and, the reactants can be added to the intercalates, or exfoliated intercalates for in situ polymerization of the polyester while in contact with the layered material, before or after exfoliation of the intercalates.

Polyesters which are suitable for use as matrix polymers in this embodiment of the invention are those which are derived from the condensation of aromatic, cycloaliphatic, and aliphatic diols with aliphatic, aromatic and cycloaliphatic dicarboxylic acids and may be cycloaliphatic, aliphatic or aromatic polyesters.

Exemplary of useful cycloaliphatic, aliphatic and aromatic polyesters which can be utilized as matrix polymers in the practice of this embodiment of the invention are poly (ethylene terephthalate), poly(cyclohexylenedimethylene terephthalate), poly(ethylene dodecate), poly(butylene terephthalate), poly[ethylene(2,7-naphthalate)], poly (methaphenylene isophthalate), poly(glycolic acid), poly (ethylene succinate), poly(ethylene adipate), poly(ethylene sebacate), poly(decamethylene azelate), poly (decamethylene adipate), poly(decamethylene sebacate), poly(dimethylpropiolactone), poly(para-hydroxybenzoate) (EKONOL), poly(ethylene oxybenzoate) (A-tell), poly (ethylene isophthalate), poly(tetramethylene terephthalate, poly(hexamethylene terephthalate), poly(decamethylene terephthalate), poly(1,4-cyclohexane dimethylene terephthalate) (trans), poly(ethylene 1,5-naphthalate), poly (ethylene 2,6-naphthalate), poly(1,4-cyclohexylidene dimethylene terephthalate), (KODEL) (cis), and poly(1,4-cyclohexylidene dimethylene terephthalate (KODEL) (trans).

Polyester compounds prepared from the condensation of a diol and an aromatic dicarboxylic acid are especially suitable as matrix polymers in accordance with this embodiment of the present invention. Illustrative of such useful aromatic carboxylic acids are terephthalic acid, isophthalic acid and a o-phthalic acid, 1,3-naphthalene-dicarboxylic acid, 1,4-naphthalenedicarboxylic acid, 2,6-naphthalenedicarboxylic acid, 2,7-naphthalene-dicarboxylic acid, 4,4'-diphenyldicarboxylic acid, 4,4'-diphenylsulfone-dicarboxylic acid, 1,1,3-trimethyl-5-carboxy-3-(p-carboxyphenyl)-idane, diphenyl ether 4,4'-dicarboxylic acid, bis-p(carboxy-phenyl) methane and the like. Of the aforementioned aromatic dicarboxylic acids, those based on a benzene ring (such as terephthalic acid, isophthalic acid, orthophthalic acid) are preferred for use in the practice of this invention. Among these preferred acid precursors, terephthalic acid is particularly preferred acid precursor.

Still other useful thermoplastic homopolymers and copolymer matrix polymers for forming nanocomposites with the onium ion MXD6 nylon intercalated layered materials of the present invention are polymers formed by polymerization of alpha-beta-unsaturated monomers or the formula:

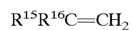

$R^{15}R^{16}C{=}CH_2$ wherein:

$R^{15}$ and $R^{16}$ are the same or different and are cyano, phenyl, carboxy, alkylester, halo, alkyl, alkyl substituted with one or more chloro or fluoro, or hydrogen. Illustrative of such preferred homopolymers and copolymers are homopolymers and copolymers of ethylene, propylene, vinyl alcohol, acrylonitrile, vinylidene chloride, esters of acrylic acid, esters of methacrylic acid, chlorotrifluoroethylene, vinyl chloride and the like. Preferred are poly(propylene), propylene copolymers, poly(ethylene) and ethylene copolymers. More preferred are poly(ethylene) and poly(propylene).

The mixture may include various optional components which are additives commonly employed with polar organic liquids. Such optional components include nucleating agents, fillers, plasticizers, impact modifiers, chain extenders, plasticizers, colorants, mold release lubricants, antistatic agents, pigments, fire retardants, and the like. These optional components and appropriate amounts are well known to those skilled in the art.

The amount of onium ion/MXD6 nylon intercalated layered material included in the liquid carrier or solvent compositions to form the viscous compositions suitable to deliver the carrier or some carrier-dissolved or carrier-dispersed active material, such as a pharmaceutical, may vary widely depending on the intended use and desired viscosity of the composition. For example, relatively higher amounts of intercalates, i.e., from about 10% to about 30% by weight of the total composition, are used in forming solvent gels having extremely high viscosities, e.g., 5,000 to 5,000,000 centipoises. Extremely high viscosities, however, also can be achieved with a relatively small concentration of intercalates and/or exfoliates thereof, e.g., 0.1% to 5% by weight, by adjusting the pH of the composition in the range of about 0–6 or about 10–14 and/or by heating the composition above room temperature, e.g., in the range of about 25° C. to about 200° C., preferably about 75° C. to about 100° C. It is preferred that the intercalate or platelet loading be less than about 10% by weight of the composition. Intercalate or platelet particle loadings within the range of about 0.01% to about 40% by weight, preferably about 0.05% to about 20%, more preferably about 0.5% to about 10% of the total weight of the composition significantly increases the viscosity of the composition. In general, the amount of intercalate and/or platelet particles incorporated into the carrier/solvent is less than about 20% by weight of the total composition, and preferably from about 0.05% to about 20% by weight of the composition, more preferably from about 0.01% to about 10% by weight of the composition, and most preferably from about 0.01% to about 5%, based on the total weight of the composition.

In accordance with an important feature of the present invention, the intercalate and/or platelet/carrier compositions of the present invention can be manufactured in a concentrated form, e.g., as a concentrate, e.g, having about 10–90%, preferably about 20–80% intercalate and/or exfoliated platelets of layered material and about 10–90%, preferably about 20–80% matrix polymer, particularly MXD6 nylon. The concentrate can be dispersed in the matrix polymer and optionally exfoliated, before or after addition to a polymer melt to a desired intercalate and/or platelet loading.

In one embodiment, the onium ion/MXD6 nylon intercalates, and/or exfoliates thereof, are mixed with a carrier or solvent to produce viscous compositions of the carrier or solvent optionally including one or more active compounds, such as an antiperspirant compound, dissolved or dispersed in the carrier or solvent.

When shear is employed for exfoliation, any method which can be used to apply a shear to the intercalate/matrix polymer nanocomposite composition can be used. The shearing action can be provided by any appropriate method, as for example by mechanical means, by thermal shock, by pressure alteration, or by ultrasonics, all known in the art. In particularly useful procedures, the composition is sheared by mechanical methods in which the intercalate, with or without the carrier or solvent, is sheared by use of mechanical means, such as stirrers, Banbury® type mixers, Brabender® type mixers, long continuous mixers, and extruders. Another procedure employs thermal shock in which shearing is achieved by alternatively raising or lowering the temperature of the composition causing thermal expansions and resulting in internal stresses which cause the shear. In still other procedures, shear is achieved by sudden pressure changes in pressure alteration methods; by ultrasonic techniques in which cavitation or resonant vibrations which cause portions of the composition to vibrate or to be excited at different phases and thus subjected to shear. These methods of shearing are merely representative of useful methods, and any method known in the art for shearing intercalates may be used.

Mechanical shearing methods may be employed such as by extrusion, injection molding machines, Banbury® type mixers, Brabender® type mixers and the like. Shearing also can be achieved by introducing the layered material and intercalant monomer at one end of an extruder (single or double screw) and receiving the sheared material at the other end of the extruder. The temperature of the layered material/intercalant monomer composition, the length of the extruder, residence time of the composition in the extruder and the design of the extruder (single screw, twin screw, number of flights per unit length, channel depth, flight clearance, mixing zone, etc.) are several variables which control the amount of shear to be applied for exfoliation.

In accordance with an important feature of the present invention, it has been found that the onium ion-intercalated clay can be intercalated with the MXD6 nylon polymer by direct compounding, i.e., by mixing the onium ion-intercalated layered material, e.g., smectite clay, directly with the MXD6 nylon in an extruder to make the onium ion/MXD6 nylon intercalated clay without significant exfoliation of the clay platelets. The intercalate-filled MXD6 nylon matrix polymer extrudes into a homogeneous transparent film with excellent dispersion of the intercalate, and exceptional gas ($O_2$) impermeability. The intercalate dispersed within the MXD6 nylon is a combination of exfoliated platelets and multi-layer tactoids dispersed in the MXD6 nylon matrix polymer. The tactoids have the thickness of at least two individual platelet layers plus one to five monolayer thicknesses of intercalated MXD6 nylon polymer, and include small multiples or aggregates of platelets, in a coplanar aggregate, having the onium ions bonded or complexed or ion-exchanged to the platelet surface(s).

Molding compositions comprising an MXD6 nylon matrix polymer containing a desied loading of the onium ion/MXD6 nylon intercalates of the present invention, and/or individual platelets obtained from exfoliation of the intercalates manufactured according to the present invention, are outstandingly suitable for the production of sheets, films and panels having valuable properties. Such sheets, films and panels may be shaped by conventional processes such as vacuum processing or by hot pressing to form useful objects. The sheets and panels according to the invention are also suitable as coating materials for other materials comprising, for example, wood, glass, ceramic, metal or other plastics, and outstanding strengths can be achieved using conventional adhesion promoters, for example, those based on vinyl resins. The sheets, films and panels can be laminated to other plastic films, sheets or panels and this is preferably effected by co-extrusion, the sheets being bonded in the molten state. The surfaces of the sheets, films and panels, including those in the embossed form, can be improved or finished by conventional methods, for example by lacquering or by the application of protective films.

MXD6 nylon matrix polymer/intercalate composite materials are especially useful for fabrication of extruded films and film laminates, as for example, films for use in food packaging that have permeabilities less than 0.1 cc, per 100 $in^2$ test area, per day, per mil thickness, and as low as 0.001 cc per 100 $in^2$, per day, per mil thickness. Such films can be fabricated using conventional film extrusion techniques. The films are preferably from about 10 to about 100 microns, more preferably from about 20 to about 100 microns and most preferably from about 25 to about 75 microns in thickness.

The homogeneously distributed intercalate, and/or exfoliated platelets thereof, which has been onium ion and MXD6 nylon intercalated in accordance with the present invention, and an MXD6 nylon matrix polymer that form the preferred embodiment of the nanocomposite compositions of the present invention are formed into a film by suitable film-forming methods. Typically, the composition is melted and forced through a film forming die after MXD6 nylon intercalation and compounding. The film of the nanocomposite may go through sequential steps to cause the intercalate and/or exfoliated platelets thereof to be further oriented so the major planes through the intercalates and/or platelets thereof are substantially parallel to the major plane through the film. One method to accomplish this is to biaxially stretch the film. For example, the film is stretched in the axial or machine direction by tension rollers pulling the film as it is extruded from the die. The film is simultaneously stretched in the transverse direction by clamping the edges of the film and drawing them apart. Alternatively, the film is stretched in the transverse direction by using a tubular film die and blowing the film up as it passes from the tubular film die. The films may exhibit one or more of the following benefits in addition to decreased permeability to gases, particularly $O_2$: increased modulus; increased wet strength; increased dimensional stability; and decreased moisture adsorption.

The following examples are presented to more particularly illustrate the invention and are not to be construed as limiting the scope of the invention.

EXAMPLE 1

A sodium bentonite clay (PGW) was slurried in water to provide about 10% by weight clay/90% by weight water, and two different onium ion spacing/coupling agents were intercalated into different PGW clay samples by adding the onium ion-containing agent to the slurry water in an amount of 100% by weight, based on the weight of the clay. Onium ion intercalation was evidenced by the platelet spacing increasing to about 18 Å. One onium compound (octadecyl amine or ODA) was obtained by dissolving octadecyl ammonium chloride in the slurry water. The second onium ion compound (Stepan) was obtained from Stepan Chemical, and was n-alkyl dimethyl benzyl amine obtained by dissolving n-alkyl dimethyl benzyl ammonium chloride (BTC 50 USP) in the clay slurry water, wherein the alkyl was a $C_8$+ mixed $C_8$, $C_{12}$, $C_{14}$, $C_{16}$ alkyl. The onium ion-intercalated clay was dried in an oven overnight to 1% by weight moisture or less) and then directly compounded with MXD6 nylon in amounts of 2.5% by weight onium ion-MXD6 nylon co-intercalated clay and 5.0% by weight onium ion-MXD6 nylon co-intercalated clay in 97.5% by weight and 95% by weight MXD6 nylon, respectively, in an extruder. In the extruder, the MXD6 nylon was intercalated into the onium ion-intercalated clay, as evidenced by an increase in d-spacing from about 18 Å to about 28 Å. For comparison purposes, the same octadecyl amine-intercalated clay was compounded and co-intercalated with 3.5% by weight nylon 6. The co-intercalated clay (onium ions and MXD6 nylon or onium ions and nylon 6) was then tested for oxygen permeability, with the results shown in Table 1.

TABLE 1

NYLON 6 AND NYLON-MXD6 TEST CONDITIONS AND RESULTS SUMMARY

| Conditions For Oxygen Permeability Testing | |
|---|---|
| Instrumentation: | Modern Controls, Inc. Ox-Tran 2/20 ML and SL modules |
| Film Preparation: | Three days conditioning at standard lab atmosphere after extrusion |
| Film Thickness: | 2–5 mils |
| Film Test Area: | 100 sq. in. |
| Test Humidity: | 65% |
| Test Temperature: | 23° C. |
| Condition Hours: | 2 |
| Zero Time: | 40 hours |
| Test Time: | 120 hours |
| Test Gas: | 100% Oxygen (flow = 20 ml/min) |
| Carrier Gas: | 90% Nitrogen/10% Hydrogen (flow = 10 ml/min) |
| Results Summary (Value at 120 Hours) | |
| Nylon-MXD6 non-oriented: | 0.443 cc/100 $in^2$-day-mil |
| 2.5% PGW/ODA-MXD6 (direct compounding): | 0.012 cc/100 $in^2$-day-mil |
| 5.0% PGW/ODA-MXD6 (direct compounding): | <0.001 cc/100 $in^2$-day-mil |
| 2.5% PGW/BTC-50-MXD6 (direct compounding): | 0.033 cc/100 $in^2$-day-mil |
| 5.0% PGW/BTC-50-MXD6 (direct compounding): | 0.066 cc/100 $in^2$-day-mil |
| Nylon 6 non-oriented: | 2.90 cc/100 $in^2$-day-mil |
| 2.5% PGW/ODA-Nylon 6 (direct compounding): | 1.13 cc/100 $in^2$-day-mil |

EXAMPLE 2

A sodium bentonite clay (PGW) was slurried in 1900 grams of water to provide about 5% by weight clay/95% by weight water, and an octadecylamine (ODA) onium ion spacing/coupling agent was intercalated into PGW clay samples by adding the onium ion to the slurry water in an amount of 100% by weight, based on the weight of the clay. Onium ion intercalation was evidenced by the interlaminar platelet spacing increasing from about 9 Å to about 12 Å. The onium compound (octadecyl- amine or ODA) was obtained by dissolving octadecyl ammonium chloride in the slurry water. The ODA-intercalated clay was dried in an oven overnight to 1% by weight moisture or less) and then directly compounded with MXD6 nylon in amounts of 2.5% by weight onium ion-intercalated clay and 5.0% by weight onium ion-intercalated clay in 97.5% by weight and 95% by weight MXD6 nylon, respectively, in an extruder. In the extruder, the MXD6 nylon was intercalated into the onium ion-intercalated clay, as evidenced by an increase in platelet spacing from about 12 Å to about 26 Å or more. For comparison purposes, a film of MXD6 nylon, without the octadecylamine-intercalated clay, was also cast into a film. The three films were formed and tested for oxygen permeability. The first film (FIG. 1) was prepared from MXD6 nylon alone in a thickness of 2.7 mils. The second film (FIG. 2) included 2.5% by weight of the ODA/MXD6-intercalate and was formed to a thickness of 2.7 mils. The third film (FIG. 3) included 5.0% by weight of the ODA/MXD6 co-intercalate and was formed to a thickness of 4.1 mils. The data of Tables 6–8 and FIGS. 1–3 are total $O_2$ permeability in cc/100 $in^2$/day and should be multiplied by thickness (in mils) to obtain $O_2$ permeability per mil thickness. The MXD6 films containing the co-intercalated clay (ODA onium ions and MXD6 nylon) and the pure MXD6 nylon film were then tested for oxygen permeability, with the results shown in the following Tables 2–4, corresponding to FIGS. 1–3, respectively.

As shown in FIGS. 2 and 3, gas barrier properties are unexpectedly superior for the MXD6 intercalate in an MXD6 nylon matrix polymer in comparison to the MXD6 film without the MXD6 intercalate.

TABLE 2

Mocon OX-TRAN 2/20 oxygen transmission (Values are expressed in cc/100 $in^2$/day*)

| Time (hours) | Value | Time (hours) | Value | Time (hours) | Value | Time (hours) | Value | Time (hours) | Value |
|---|---|---|---|---|---|---|---|---|---|
| 0:00 | Wait | 43:00 | .022884 | 86:00 | .024942 | 124:01 | .159619 | 167:01 | .162284 |
| 1:59 | Zero | 45:00 | .024084 | 88:00 | .025123 | 126:01 | .159361 | 169.01 | .162187 |
| 4:00 | .126226 | 47:00 | .024516 | 90:00 | .025174 | 128:01 | .157961 | 172:01 | .162323 |
| 6:00 | .044284 | 49:00 | .025084 | 90:00 | W Gas | 130:01 | .157516 | 174:01 | .162703 |
| 8:00 | .019723 | 51:00 | .025735 | 90:00 | Cond | 133:01 | .158523 | 176:01 | .162168 |
| 10:00 | .013452 | 53:00 | .024774 | 92:00 | Test | 135:01 | .158910 | 178:01 | .163735 |
| 12:00 | .012839 | 56:00 | .022110 | 94:01 | .152097 | 137:01 | .159768 | 180:01 | .164323 |
| 14:00 | .014019 | 58:00 | .023781 | 96:01 | .156013 | 139:01 | .161097 | 182:01 | .164529 |
| 17:00 | .017877 | 60:00 | .024174 | 98:01 | .156903 | 141:01 | .161806 | 185:01 | .164710 |
| 19:00 | .020161 | 62:00 | .024639 | 100:01 | .156994 | 143:01 | .160606 | 187:01 | .164006 |
| 21:00 | .020877 | 64:00 | .024981 | 102:01 | .157394 | 146:01 | .160916 | 189:01 | .165213 |
| 23:00 | .021413 | 66:00 | .025116 | 104:01 | .157729 | 148:01 | .160465 | 191:01 | .163897 |
| 25:00 | .021600 | 69:00 | .023335 | 107:01 | .156123 | 150:01 | .160465 | 193:01 | .164665 |
| 27:00 | .021142 | 71:00 | .024903 | 109:01 | .156484 | 152:01 | .161097 | 195:01 | .164032 |
| 30:00 | .020890 | 73:00 | .025587 | 111:01 | .157265 | 154:01 | .161497 | 198:01 | .165026 |
| 32:00 | .023297 | 75:00 | .026161 | 113:01 | .157677 | 156:01 | .162155 | 200:01 | .164097 |
| 34:00 | .023942 | 77:00 | .025355 | 115:01 | .158987 | 159:01 | .161845 | 202:01 | .165594 |
| 36:00 | .024439 | 79:00 | .024600 | 117:01 | .160400 | 161:01 | .161690 | 204:01 | .166826 |
| 38:00 | .024826 | 82:00 | .022935 | 120:01 | .159245 | 163:01 | .162826 | 206:01 | .167703 |
| 40:00 | .024613 | 84:00 | .024710 | 122:01 | .159329 | 165:01 | .162665 | 208:01 | .167806 |

TABLE 2-continued

Mocon OX-TRAN 2/20 oxygen transmission
(Values are expressed in cc/100 in$^2$/day*)

| Time (hours) | Value | Time (hours) | Value | Time (hours) | Value | Time (hours) | Value | Time (hours) | Value |
|---|---|---|---|---|---|---|---|---|---|
| 211:01 | .167484 | 245:01 | .173077 | 280:01 | .172252 | 313:50 | .171342 | 347:50 | .165761 |
| 213:01 | .167729 | 247:01 | .172555 | 282:01 | .172432 | 315:50 | .168335 | 349:50 | .166316 |
| 215:01 | .167045 | 250:01 | .173587 | 284:01 | .171819 | 317:50 | .169000 | 352:50 | .164406 |
| 217:01 | .164213 | 252:01 | .173503 | 286:01 | .172032 | 319:50 | .169923 | 354:50 | .165832 |
| 219:01 | .173600 | 254:01 | .173884 | 289:01 | .170484 | 321:50 | .169948 | 356:50 | .166071 |
| 221:01 | .173755 | 256:01 | .173910 | 291:01 | .169684 | 323:50 | .170052 | 358:50 | .164826 |
| 224:01 | .173413 | 258:01 | .173684 | 293:01 | .170819 | 326:50 | .167045 | 360:50 | .163497 |
| 226:01 | .173710 | 260:01 | .173232 | 295:01 | .170735 | 328:50 | .167181 | 362:50 | .163477 |
| 228:01 | .173503 | 263:01 | .172852 | 297:01 | .172516 | 330:50 | .166819 | 365:50 | .164716 |
| 230:01 | .173310 | 265:01 | .172471 | 299:01 | .173129 | 332:50 | .166768 | 367:50 | .165600 |
| 232:01 | .173735 | 267:01 | .172142 | 302:01 | .172290 | 334:50 | .165123 | 369:50 | .165865 |
| 234:01 | .173645 | 269:01 | .171277 | 304:01 | .171426 | 336:50 | .164961 | 371:50 | .165303 |
| 237:01 | .173032 | 271:01 | .170535 | 306:01 | .172497 | 339:50 | .164335 | 373:50 | .164574 |
| 239:01 | .172787 | 273:01 | .171826 | 308:01 | .170342 | 341:50 | .165123 | 375:50 | .163361 |
| 241:01 | .172858 | 276:01 | .172465 | 310:01 | .173284 | 343:50 | .165290 | | |
| 243:01 | .173858 | 278:01 | .172903 | 311:27 | .178935 | 345:50 | .166129 | | |

*All values are compensated to a barometric pressure of 760 mmHg.

TABLE 3

Mocon OX-TRAN 2/20 oxygen transmission
(Values are expressed in cc/100 in$^2$/day*)

| Time (hours) | Value | Time (hours) | Value | Time (hours) | Value | Time (hours) | Value | Time (hours) | Value |
|---|---|---|---|---|---|---|---|---|---|
| 0:00 | Wait | 44:00 | .017361 | 87:00 | .018723 | 127:01 | .029103 | 170:01 | .038826 |
| 1:59 | Zero | 46:00 | .018000 | 89:00 | .018839 | 129:01 | .029123 | 173:01 | .039471 |
| 5:00 | .030787 | 48:00 | .018123 | 89:00 | W Gas | 131:01 | .029994 | 175:01 | .039581 |
| 7:00 | .018729 | 50:00 | .018587 | 90:00 | Cond | 134:01 | .031400 | 177:01 | .040342 |
| 9:00 | .012510 | 52:00 | .018787 | 92:00 | Test | 136:01 | .032406 | 179:01 | .040942 |
| 11:00 | .011077 | 54:00 | .018361 | 95:01 | .001290 | 138:01 | .034006 | 181:01 | .041348 |
| 13:00 | .011284 | 57:00 | .017116 | 97:01 | .002445 | 140:01 | .034813 | 183:01 | .041606 |
| 15:00 | .011606 | 59:00 | .017600 | 99:01 | .006077 | 142:01 | .035316 | 186:01 | .041665 |
| 18:00 | .015748 | 61:00 | .017910 | 101:01 | .008948 | 144:01 | .035323 | 188:01 | .041439 |
| 20:00 | .016090 | 63:00 | .018239 | 103:01 | .011503 | 147:01 | .035026 | 190:01 | .041645 |
| 22:00 | .016258 | 65:00 | .018542 | 105:01 | .015245 | 149:01 | .035716 | 192:01 | .041735 |
| 24:00 | .016161 | 67:00 | .018490 | 108:01 | .016594 | 151:01 | .035916 | 194:01 | .042187 |
| 26:00 | .015723 | 70:00 | .018581 | 110:01 | .019077 | 153:01 | .036742 | 196:01 | .041677 |
| 28:00 | .015884 | 72:00 | .018432 | 112:01 | .021116 | 155:01 | .037342 | 199:01 | .042071 |
| 31:00 | .016232 | 74:00 | .019142 | 114:01 | .022955 | 157:01 | .037877 | 201:01 | .042877 |
| 33:00 | .017097 | 76:00 | .019252 | 116:01 | .024761 | 160:01 | .038039 | 203:01 | .043574 |
| 35:00 | .017542 | 78:00 | .018426 | 118:01 | .026632 | 162:01 | .038503 | 205:01 | .044065 |
| 37:00 | .017871 | 80:00 | .017761 | 121:01 | .026335 | 164:01 | .038929 | 207:01 | .044497 |
| 39:00 | .017935 | 83:00 | .018026 | 123:01 | .027510 | 166:01 | .039052 | 209:01 | .044658 |
| 41:00 | .018039 | 85:00 | .018497 | 125:01 | .028665 | 168:01 | .038871 | 212:01 | .044168 |
| 214:01 | .044942 | 248:01 | .046910 | 283:01 | .047974 | 316:50 | .049084 | 350:50 | .047710 |
| 216:01 | .044090 | 251:01 | .047168 | 285:01 | .047613 | 318:50 | .049432 | 353:50 | .046968 |
| 218:01 | .044865 | 253:01 | .047465 | 287:01 | .047419 | 320:50 | .050310 | 355:50 | .047800 |
| 220:01 | .046316 | 255:01 | .047735 | 290:01 | .046884 | 322:50 | .050768 | 357:50 | .047335 |
| 222:01 | .045613 | 257:01 | .047735 | 292:01 | .046987 | 324:50 | .050761 | 359:50 | .046632 |
| 225:01 | .045787 | 259:01 | .047587 | 294:01 | .047787 | 327:50 | .047503 | 361:50 | .046129 |
| 227:01 | .046116 | 261:01 | .047613 | 296:01 | .048303 | 329:50 | .047697 | 363:50 | .046039 |
| 229:01 | .046097 | 264:01 | .047290 | 298:01 | .048355 | 331:50 | .047510 | 366:50 | .047503 |
| 231:01 | .046400 | 266:01 | .047329 | 300:01 | .048555 | 333:50 | .047910 | 368:50 | .047426 |
| 233:01 | .046910 | 268:01 | .046948 | 303:01 | .047806 | 335:50 | .046406 | 370:50 | .047516 |
| 235:01 | .047058 | 270:01 | .047039 | 305:01 | .047871 | 337:50 | .046458 | 372:50 | .047103 |
| 238:01 | .046329 | 272:01 | .046910 | 307:01 | .048342 | 340:50 | .046458 | 374:50 | .046697 |
| 240:01 | .046413 | 274:01 | .047387 | 309:01 | .047981 | 342:50 | .046555 | 376:50 | .046071 |
| 242:01 | .047071 | 277:01 | .047774 | 311:01 | .047626 | 344:50 | .047432 | | |
| 244:01 | .046877 | 279:01 | .048129 | 311:50 | .011606 | 346:50 | .047652 | | |
| 246:01 | .046619 | 281:01 | .048181 | 314:50 | .049335 | 348:50 | .048135 | | |

*All values are compensated to a barometric pressure of 760 mmHg.

TABLE 4

Mocon OX-TRAN 2/20 oxygen transmission (Values are expressed in cc/100 in²/day*)

| Time (hours) | Value | Time (hours) | Value | Time (hours) | Value | Time (hours) | Value | Time (hours) | Value |
|---|---|---|---|---|---|---|---|---|---|
| 0:00 | Wait | 43:00 | .018484 | 86:00 | .020632 | 124:01 | −0.0025 | 167:01 | −0.0030 |
| 1:58 | Zero | 45:00 | .018155 | 88:00 | .020581 | 126:01 | −0.0037 | 169:01 | −0.0027 |
| 4:00 | .115284 | 47:00 | .018710 | 90:00 | .020439 | 128:01 | −0.0044 | 172:01 | −0.0027 |
| 6:00 | .041161 | 49:00 | .019490 | 90:00 | W Gas | 130:01 | −0.0049 | 174:01 | −0.0019 |
| 8:00 | .019129 | 51:00 | .020284 | 90:00 | Cond | 133:01 | −0.0033 | 176:01 | −0.0030 |
| 10:00 | .013484 | 53:00 | .018600 | 91:59 | Test | 135:01 | −0.0030 | 178:01 | −0.0016 |
| 12:00 | .013026 | 56:00 | .018213 | 94:01 | −0.0015 | 137:01 | −0.0024 | 180:01 | −0.0017 |
| 14:00 | .013819 | 58:00 | .018600 | 96:01 | −0.0029 | 139:01 | −0.0020 | 182:01 | −0.0019 |
| 17:00 | .015265 | 60:00 | .019303 | 98:01 | −0.0031 | 141:01 | −0.0012 | 185:01 | −0.0020 |
| 19:00 | .015994 | 62:00 | .019729 | 100:01 | −0.0038 | 143:01 | −0.0018 | 187:01 | −0.0026 |
| 21:00 | .015987 | 64:00 | .019910 | 102:01 | −0.0038 | 146:01 | −0.0025 | 189:01 | −0.0018 |
| 23:00 | .016174 | 66:00 | .020090 | 104:01 | −0.0044 | 148:01 | −0.0023 | 191:01 | −0.0031 |
| 25:00 | .016135 | 69:00 | .020290 | 107:01 | −0.0035 | 150:01 | −0.0023 | 193:01 | −0.0023 |
| 27:00 | .015568 | 70:00 | .019955 | 109:01 | −0.0033 | 152:01 | −0.0027 | 195:01 | −0.0022 |
| 30:00 | .016619 | 73:00 | .021206 | 111:01 | −0.0033 | 154:01 | −0.0024 | 198:01 | −0.0018 |
| 32:00 | .017729 | 75:00 | .021645 | 113:00 | −0.0031 | 156:01 | −0.0022 | 200:01 | −0.0024 |
| 34:00 | .017884 | 77:00 | .019690 | 115:00 | −0.0032 | 159:01 | −0.0024 | 202:01 | −0.0012 |
| 36:00 | .018252 | 79:00 | .019277 | 117:01 | −0.0023 | 161:01 | −0.0026 | 204:01 | −0.0012 |
| 38:00 | .018465 | 82:00 | .020019 | 120:01 | −0.0030 | 163:01 | −0.0014 | 206:01 | −0.0011 |
| 40:00 | .018058 | 84:00 | .020600 | 122:01 | −0.0021 | 165:01 | −0.0022 | 208:01 | −0.0012 |
| 211:01 | −0.0020 | 245:01 | −0.0020 | 280:01 | −0.0015 | 312:32 | −0.0048 | 346.32 | −0.0012 |
| 213:01 | −0.0015 | 247:01 | −0.0024 | 282:01 | −0.0016 | 314:32 | −0.0046 | 348:32 | −0.0005 |
| 215:01 | −0.0024 | 250:01 | −0.0017 | 284:01 | −0.0020 | 316:32 | −0.0058 | 351:32 | −0.0023 |
| 217:01 | −0.0017 | 252:01 | −0.0014 | 286:01 | −0.0018 | 318:32 | −0.0046 | 353:32 | −0.0027 |
| 219:01 | −0.0016 | 254:01 | −0.0012 | 289:01 | −0.0022 | 320:32 | −0.0040 | 355:32 | −0.0006 |
| 221:01 | −0.0023 | 256:01 | −0.0014 | 291:01 | −0.0023 | 322:32 | −0.0038 | 357:32 | −0.0017 |
| 224:01 | −0.0019 | 258:01 | −0.0016 | 293:01 | −0.0014 | 325:32 | −0.0016 | 359:32 | −0.0026 |
| 226:01 | −0.0016 | 260:01 | −0.0017 | 295:01 | −0.0012 | 327:32 | −0.0019 | 361:32 | −0.0031 |
| 228:01 | −0.0015 | 263:01 | −0.0022 | 297:01 | −0.0003 | 329:32 | −0.0015 | 364:32 | −0.0023 |
| 230:01 | −0.0016 | 265:01 | −0.0020 | 299:01 | −0.0003 | 331:32 | −0.0017 | 366:32 | −0.0006 |
| 232:01 | −0.0016 | 267:01 | −0.0023 | 302:01 | −0.0018 | 333:32 | −0.0004 | 368:32 | −0.0009 |
| 234:01 | −0.0110 | 269:01 | −0.0029 | 304:01 | −0.0023 | 335:32 | −0.0034 | 370:32 | −0.0011 |
| 237:01 | −0.0024 | 271:01 | −0.0036 | 306:01 | −0.0006 | 338:32 | −0.0024 | 372:32 | −0.0015 |
| 239:01 | −0.0022 | 273:01 | −0.0020 | 308:01 | −0.0013 | 340:32 | −0.0028 | 374:32 | −0.0020 |
| 241:01 | −0.0020 | 276:01 | −0.0018 | 310:01 | −0.0010 | 342:32 | −0.0021 | 377:32 | −0.0022 |
| 243:01 | −0.0015 | 278:01 | −0.0014 | 311:12 | −0.0028 | 344:32 | −0.0014 | | |

*All values are compensated to a barometric pressure of 760 mmHg.

What is claimed is:

1. A nanocomposite composition comprising about 0.05 weight percent to about 40 weight percent of a layered silicate material intercalated with an onium ion spacing agent and about 60 weight percent to about 99.95 weight percent of a matrix polymer comprising the reaction product of meta-xylylene diamine and a dicarboxylic acid, wherein the intercalated layered silicate material is dispersed uniformly throughout the matrix polymer.

2. A nanocomposite composition in accordance with claim 1, wherein the matrix polymer is co-intercalated into the layered silicate material.

3. A nanocomposite composition in accordance with claim 2, wherein the matrix polymer is co-intercalated into the layered silicate material while dispersing the layered material throughout the matrix polymer.

4. A nanocomposite composition in accordance with claim 2, wherein the matrix polymer is co-intercalated into the layered silicate material prior to dispersing the layered silicate material throughout the matrix polymer.

5. A nanocomposite composition in accordance with claim 1, wherein the matrix polymer is a polymer or oligomer of the reaction product of meta-xylylene diamine and adipic acid.

6. A nanocomposite composition in accordance with claim 1, wherein the onium ions include at least one moiety covalently bonded to a positively charged nitrogen atom that has a length of at least six carbon atoms.

7. A nanocomposite composition comprising a matrix polymer in an amount of about 40% to about 99.95% by weight, and about 0.05% to about 60% by weight of an intercalated phyllosilicate material formed by contacting a phyllosilicate with intercalant onium ions to form an intercalating composition, having a molar ratio of onium ions:phyllosilicate interlayer exchangeable cations of at least about 0.25:1 to achieve sorption of the onium ions between adjacent spaced layers of the phyllosilicate to expand the spacing between a predominance of the adjacent phyllosilicate platelets at least about 3 Å, when measured after sorption of the onium ions, and a second intercalant disposed between adjacent spaced layers of the phyllosilicate material, said second intercalant comprising a nylon polymer formed by polymerizing a reaction product of meta-xylylene diamine and a dicarboxylic acid.

8. A composition in accordance with claim 7, wherein the intercalated phyllosilicate is exfoliated into a predominance of individual platelets.

9. A composition in accordance with claim 7, wherein the dicarboxylic acid is adipic acid.

10. A composition in accordance with claim 9, wherein the second intercalant is intercalated into the phyllosilicate from an intercalating composition containing said second intercalant in a concentration of at least about 5% by weight, based on the dry weight of the phyllosilicate in the intercalating composition.

11. A composition in accordance with claim 9, wherein the concentration of the second intercalant in said intercalating composition is at least about 20% by weight, based on the dry weight of the phyllosilicate in the intercalating composition.

12. A composition in accordance with claim 11, wherein the concentration of the second intercalant in said intercalating composition is at least about 30% by weight, based on the dry weight of the phyllosilicate in the intercalating composition.

13. A composition in accordance with claim 12, wherein the concentration of the second intercalant in said intercalating composition in the range of about 50% to about 80% by weight, based on the dry weight of the phyllosilicate in the intercalating compound.

14. A composition in accordance with claim 12, wherein the concentration of the second intercalant in said intercalating composition in the range of about 50% to about 200% by weight, based on the dry weight of the phyllosilicate in the intercalating composition.

15. A composition in accordance with claim 7, wherein the molar ratio of intercalant onium ions:phyllosilicate interlayer exchangeable cations is at least 0.5:1.

16. A composition in accordance with claim 7, wherein the molar ratio of intercalant onium ions:phyllosilicate interlayer exchangeable cations is at least 1:1.

17. A composition in accordance with claim 7, wherein the onium ions are multi-onium ion compounds that include at least two primary, secondary, tertiary or quaternary ammonium, phosphonium, sulfonium, or oxonium ions.

18. A composition in accordance with claim 7, wherein the matrix polymer is MXD6 nylon.

19. A nanocomposite concentrate composition comprising about 10% by weight to about 90% by weight of a layered material intercalated with a polymer or oligomer of the reaction product of meta-xylylene diamine and a dicarboxylic acid and about 10 weight percent to about 90 weight percent of a matrix polymer comprising the reaction product of meta-xylylene diamine and a dicarboxylic acid, wherein the intercalated layered silicate material is dispersed uniformly throughout the matrix polymer.

20. A nanocomposite composition in accordance with claim 19, wherein the matrix polymer is intercalated into the layered silicate material.

21. A nanocomposite composition in accordance with claim 20, wherein the matrix polymer is intercalated into the layered silicate material while dispersing the layered material throughout the matrix polymer.

22. A nanocomposite composition in accordance with claim 20, wherein the matrix polymer is intercalated into the layered silicate material prior to dispersing the layered silicate material throughout the matrix polymer.

23. A nanocomposite composition in accordance with claim 19, wherein both the matrix polymer and the polymer intercalated into the layered material are a polymer or oligomer of the reaction product of meta-xylylene diamine and adipic acid.

24. A nanocomposite composition in accordance with claim 19, wherein prior to intercalating the layered material with the polymer of meta-xylylene diamine and a dicarboxylic acid, the layered material is first intercalated with onium ions that include at least one moiety covalently bonded to a positively charged nitrogen atom that has a length of at least six carbon atoms.

25. A method of decreasing oxygen permeability of a film or sheet of a matrix polymer comprising dispersing throughout said matrix polymer, in an amount of about 0.05% by weight to about 30% by weight, based on the total weight of the film or sheet material and the intercalate, an intercalate formed by intercalating an onium ion between layers of a layered silicate material, wherein said matrix polymer is a polymer or oligomer formed from the reaction product of a meta-xylylene diamine and a dicarboxylic acid, such that a portion of the matrix polymer is co-intercalated between the silicate layers of the layered material.

26. A method in accordance with claim 25, wherein the matrix polymer is an oxygen scavenger.

27. A method in accordance with claim 25, wherein the matrix polymer is co-intercalated into the layered silicate material while dispersing the layered material throughout the matrix polymer.

28. A method in accordance with claim 25, wherein the matrix polymer is co-intercalated into the layered silicate material prior to dispersing the layered silicate material throughout the matrix polymer.

29. A method in accordance with claim 25, wherein the matrix polymer is a polymer or oligomer of the reaction product of meta-xylylene diamine and adipic acid.

30. A method in accordance with claim 25, wherein the onium ions include at least one moiety covalently bonded to a positively nitrogen atom that has a length of at least six carbon atoms.

31. A method of manufacturing a composite material containing about 10% to about 99.95% by weight of a matrix polymer comprising a polymer or oligomer of a reaction product of meta-xylylene diamine and a dicarboxylic acid, and about 0.05% to about 60% by weight of an intercalated phyllosilicate material, said intercalated phyllosilicate having an intercalant onium ion spacing agent intercalated between and bonded, by ion-exchange, to an inner surface of the phyllosilicate platelets, comprising:

contacting the phyllosilicate with said intercalant onium ion spacing agent, to achieve intercalation of said intercalant onium ion spacing agent between said adjacent phyllosilicate platelets in an amount sufficient to space said adjacent phyllosilicate platelets a distance of at least about 3 Å; and dispersing the intercalate throughout said matrix polymer to achieve intercalation of a portion of the matrix polymer between the phyllosilicate platelets.

32. The method of claim 31, wherein said phyllosilicate is contacted with said intercalant onium ion spacing agent, said phyllosilicate, and a nylon oligomer or polymer intercalant formed from the reaction product of meta-xylylene diamine and a dicarboxylic acid, wherein the concentration of the onium ion spacing agent is in a molar ratio of onium ions:phyllosilicate interlayer exchangeable cations of at least 0.25:1.

33. The method of claim 32, wherein said phyllosilicate is contacted with said intercalant onium ion spacing agent, said phyllosilicate, and a nylon oligomer or polymer intercalant formed from the reaction product of meta-xylylene diamine and a dicarboxylic acid, wherein the concentration of the onium ion spacing agent is in a molar ratio of onium ions:phyllosilicate interlayer exchangeable cations of at least 0.5:1.

34. The method of claim 33, wherein said phyllosilicate is contacted with said intercalant onium ion spacing agent, said phyllosilicate, and a nylon oligomer or polymer intercalant formed from the reaction product of meta-xylylene diamine and a dicarboxylic acid, wherein the concentration of the onium ion spacing agent is in a molar ratio of onium ions:phyllosilicate interlayer exchangeable cations of at least 1:1.

35. A method of manufacturing a composite material containing about 40% to about 99.95% by weight of a matrix thermoplastic or thermosetting polymer, and about 0.05% to about 60% by weight of an intercalated phyllosilicate material, said intercalated phyllosilicate having an intercalant onium ion spacing/coupling agent intercalated between adjacent phyllosilicate platelets comprising:

contacting the phyllosilicate with an intercalating composition including an intercalant onium ion spacing/coupling agent in a molar ratio of onium ions:phyllosilicate interlayer cations of at least 0.25:1, and a nylon oligomer or polymer intercalant formed from the reaction product of meta-xylylene diamine and a dicarboxylic acid, to achieve intercalation of said intercalant onium ion spacing/coupling agent and said nylon intercalant between said adjacent phyllosilicate platelets in an amount sufficient to space said adjacent phyllosilicate platelets at least an additional 3 Å;

combining the intercalated phyllosilicate with said thermoplastic or thermosetting matrix polymer, and heating the matrix polymer sufficiently to provide for flow of said matrix polymer; and dispersing said intercalated phyllosilicate throughout said matrix polymer.

36. A method in accordance with claim 35, wherein the intercalating composition includes about 10% to about 200% by weight of said nylon intercalant, based on the dry weight of phyllosilicate contacted by said intercalating composition.

37. A method in accordance with claim 35, wherein the amount of onium ion spacing/coupling agent intercalated into the phyllosilicate material is in a molar ratio of at least 0.5:1, onium ions:exchangeable cations in the interlayer spaces of the phyllosilicate material.

38. A method in accordance with claim 37, wherein the amount of intercalant onium ion spacing/coupling agent intercalated into the phyllosilicate material is in a molar ratio of at least 1:1, onium ions:exchangeable cations in the interlayer spaces of the phyllosilicate material.

39. A method in accordance with claim 38, wherein the molar ratio of intercalated onium ion spacing/coupling agent to interlayer phyllosilicate cations is from about 1:1 to about 1:5.

40. A method in accordance with claim 35, wherein the weight ratio of the nylon intercalant to phyllosilicate material, dry basis, is from about 20 grams of nylon intercalant per 100 grams of phyllosilicate material to about 200 grams of nylon intercalant per 100 grams of phyllosilicate material.

41. A method in accordance with claim 35, wherein the nylon oligomer or polymer is intercalated into the phyllosilicate by melting the nylon oligomer or polymer and dispersing the phyllosilicate throughout the nylon melt.

42. A method in accordance with claim 41, wherein the mixing is accomplished in an extruder.

43. A method of manufacturing a composite material containing about 40% to about 99.95% by weight of an oligomer or polymer formed from the reaction product of meta-xylylene diamine and a dicarboxylic acid, and about 0.05% to about 60% by weight of an intercalated phyllosilicate material comprising intercalating the phyllosilicate material with an onium ion spacing agent by contacting the phyllosilicate with onium ions in a molar ratio of onium ions:phyllosilicate interlayer exchangeable cations of at least 0.25:1;

forming a mixture of the intercalated phyllosilicate material with meta-xylylene diamine and a dicarboxylic acid; and subjecting the mixture to conditions sufficient to react and polymerize the meta-xylylene diamine with the dicarboxylic acid, to polymerize the meta-xylylene diamine and dicarboxylic acid reaction product while in contact with the intercalated phyllosilicate and to co-intercalate the resulting oligomer or polymer between adjacent platelets of the phyllosilicate material, wherein the intercalate reactants are combined in amounts such that the resulting composite material contains 40% to 99.95% oligomer or polymer and 0.05% to 60% intercalated phyllosilicate.

44. In a method of preventing the passage of oxygen to a material to be protected from oxygen contact comprising disposing a film or sheet of material between an oxygen source and the material to be protected, the improvement comprising the film or sheet material, said film or sheet material comprising a MXD6 nylon matrix polymer containing an intercalated phyllosilicate containing a MXD6 intercalant intercalated between adjacent phyllosilicate platelets in an amount sufficient to reduce the amount of oxygen contacting the material to be protected.

45. In the method of claim 44, wherein the amount of intercalate combined with the MXD6 nylon matrix polymer is in the range of about 2% to about 10% by weight intercalate, based on the total weight of the film or sheet material.

46. In the method of claim 44, wherein the amount of intercalate is in the range of about 3% to about 6% by weight.

47. In the method of claim 44, wherein the MXD6 intercalant is an oligomer formed from the reaction product of meta-xylylene diamine and adipic acid.

48. In the method of claim 47, wherein the amount of intercalate is at least about 4% by weight of the film or sheet material.

49. In the method of claim 48, wherein the amount of intercalate is at least about 5% by weight of the film or sheet material.

50. An intercalate formed by contacting a layered silicate material with an onium ion spacing/coupling agent intercalant, said intercalate having a molar ratio of intercalant onium ion spacing/coupling agent cation to interlayer cations of at least about 0.25:1, to achieve sorption and ion-exchange of the onium ion spacing/coupling agent with interlayer exchangeable cations of said layered silicate material to expand the spacing between a predominance of the adjacent platelets of said layered material at least about 3 Å, when measured after ion-exchange with the onium ion spacing/coupling agent; and a nylon oligomer or polymer second intercalant comprising the reaction product of meta-xylylene diainine and a dicarboxylic acid disposed between adjacent layers of said layered silicate material, to expand the spacing between a predominance of the adjacent platelets an additional at least 3 Å.

51. An intercalate in accordance with claim 50, wherein the layered silicate material is contacted with said onium ion spacing/coupling agent in an intercalant composition comprising said layered silicate material, said onium ion spacing/coupling agent and a carrier for said onium ion spacing/coupling agent and wherein the concentration of the onium ion spacing/coupling agent in said intercalating composition is at least about 2% by weight, based on the dry weight of the layered silicate material.

52. A method of intercalating a phyllosilicate with both an onium ion and an MXD6 nylon polymer comprising slurrying the phyllosilicate in water to form a clay/water slurry; adding the onium ion to the phyllosilicate/water slurry; separating the onium ion-treated clay from the water; drying the phyllosilicate; and then mixing the onium ion-treated phyllosilicate with MXD6 nylon to intercalate the MXD6 nylon between adjacent platelets of the phyllosilicate.

* * * * *

UNITED STATES PATENT AND TRADEMARK OFFICE
CERTIFICATE OF CORRECTION

PATENT NO. : 6,232,388 B1
DATED : May 15, 2001
INVENTOR(S) : Tie Lan et al.

It is certified that error appears in the above-identified patent and that said Letters Patent is hereby corrected as shown below:

Column 30,
Line 46, please change "dianine" to -- diamine --.

Signed and Sealed this

Third Day of December, 2002

JAMES E. ROGAN
*Director of the United States Patent and Trademark Office*